United States Patent
Nakamura et al.

(10) Patent No.: US 6,873,789 B1
(45) Date of Patent: Mar. 29, 2005

(54) AV DATA RECORDING APPARATUS AND METHOD, AND DISK RECORDED BY THE SAME

(75) Inventors: Tadashi Nakamura, Osaka (JP); Masanori Itoh, Osaka (JP); Yasumori Hino, Nara (JP); Masafumi Shimotashiro, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 801 days.

(21) Appl. No.: 09/629,744

(22) Filed: Jul. 31, 2000

(30) Foreign Application Priority Data

Aug. 3, 1999 (JP) ............................................. 11-219523
Feb. 10, 2000 (JP) ....................................... 2000-033538

(51) Int. Cl.⁷ .............................. H04N 5/85; H04N 7/04
(52) U.S. Cl. ....................................... 386/125; 386/105
(58) Field of Search ................................. 386/125, 126, 386/124, 45, 46, 1, 39, 40, 82, 104, 105, 106; H04N 5/85, 7/04

(56) References Cited

U.S. PATENT DOCUMENTS 5,946,277 A   8/1999  Kuroda et al.
6,078,727 A   6/2000  Saeki et al.
6,118,927 A * 9/2000  Kikuchi et al. ............... 386/95

FOREIGN PATENT DOCUMENTS

| EP | 676 761       | 10/1995 |
|----|---------------|---------|
| EP | 866 456       | 9/1998  |
| EP | 0866456 A1 *  | 9/1998  |
| JP | 2-265074      | 10/1990 |
| JP | 5-22682       | 1/1993  |
| JP | 5-304653      | 11/1993 |
| JP | 6-35780       | 2/1994  |
| JP | 7-121993      | 5/1995  |
| JP | 7-226902      | 8/1995  |
| JP | 7-262059      | 10/1995 |
| JP | 8-77049       | 3/1996  |
| JP | 10-208394     | 8/1998  |
| JP | 11-232838     | 8/1999  |
| JP | 3028517       | 2/2000  |
| WO | 98/14938      | 4/1998  |

* cited by examiner

Primary Examiner—Robert Chevalier
(74) Attorney, Agent, or Firm—Merchant & Gould P.C.

(57) ABSTRACT

An AV data recording apparatus and an AV data recording method are provided, in which even in the case of using the UDF file system, seeking can be minimized. The AV data recording method has file management information for managing continuous blocks on a disk as an extent, and dividing the extent into groups so as to manage the extent as a file, wherein a new directory is created on a disk, and a not recorded but allocated extent is kept as a reservation region for recording file management information.

6 Claims, 47 Drawing Sheets

| LBN | Content of data |
|---|---|
| 0~79 | Space bit map descriptor |
| 80 | File set descriptor |
| 81 | Terminating descriptor |
| 82 | File entry (Root) |
| 83 | Root directory |
| 84 | File entry (AV_DIR1) |
| 85 | Extent (1) of AV_DIR1 |
| 86~249 | Extent (2) of AV_DIR1 (not recorded but allocated) |
| 250 | File entry (AV_SUB_DIR1) |
| 251 | Extent (1) of AV_SUB_DIR1 |
| 252~398 | Extent (2) of AV_SUB_DIR1 (not recorded but allocated) |
| 400 | File entry (FILE2.DAT) |
| 401 | File entry (FILE1.DAT) |
| 402~451 | Extent of FILE1.DAT |
| 452~651 | Extent of FILE2.DAT |
| 652~Last LBN | Unallocated |

| LBN | Content of data |
|---|---|
| 0~79 | Space bit map descriptor |
| 80 | File set descriptor |
| 81 | Terminating descriptor |
| 82 | File entry (Root) |
| 83 | Root directory |
| 84 | File entry (AV_DIR1) |
| 85 | Extent (1) of AV_DIR1 |
| 86~250 | Extent (2) of AV_DIR1 (not recorded but allocated) |
| 251~Last LBN | Unallocated |

FIG. 3

| LBN | Content of data |
|---|---|
| 0~79 | Space bit map descriptor |
| 80 | File set descriptor |
| 81 | Terminating descriptor |
| 82 | File entry (Root) |
| 83 | Root directory |
| 84 | File entry (AV_DIR1) |
| 85 | Extent (1) of AV_DIR1 |
| 86~248 | Extent (2) of AV_DIR1 (not recorded but allocated) |
| 249 | File entry (FILE2.DAT) |
| 250 | File entry (FILE1.DAT) |
| 251~300 | Extent of FILE1.DAT |
| 301~500 | Extent of FILE2.DAT |
| 501~Last LBN | Unallocated |

FIG. 5

| LBN | Content of data |
|---|---|
| 0~79 | Space bit map descriptor |
| 80 | File set descriptor |
| 81 | Terminating descriptor |
| 82 | File entry (Root) |
| 83 | Root directory |
| 84 | File entry (AV_DIR1) |
| 85 | File entry (AVFILES.IFO) |
| 86 | Extent of AV_DIR1 |
| 87~250 | Extent of AVFILES.IFO (not recorded but allocated) |
| 251~Last LBN | Unallocated |

FIG. 7

| LBN | Content of data |
|---|---|
| 0~79 | Space bit map descriptor |
| 80 | File set descriptor |
| 81 | Terminating descriptor |
| 82 | File entry (Root) |
| 83 | Root directory |
| 84 | File entry (AV_DIR1) |
| 85~100 | Extent of AV_DIR1 |
| 101 | File entry (FILE1.DAT) |
| 102 | File entry (FILE2.DAT) |
| 103~199 | ⋮ |
| 200 | File entry (FILE100.DAT) |
| 201~Last LBN | Unallocated |

FIG. 9

| LBN | Content of data |
|---|---|
| 0~79 | Space bit map descriptor |
| 80 | File set descriptor |
| 81 | Terminating descriptor |
| 82 | File entry (Root) |
| 83 | Root directory |
| 84 | File entry (AV_DIR1) |
| 85 | Extent (1) of AV_DIR1 |
| 86~500 | Extent (2) of AV_DIR1 (not recorded but allocated) |
| 501~Last LBN | Unallocated |

FIG. 14

| LBN | Content of data |
|---|---|
| 0~79 | Space bit map descriptor |
| 80 | File set descriptor |
| 81 | Terminating descriptor |
| 82 | File entry (Root) |
| 83 | Root directory |
| 84 | File entry (AV_DIR1) |
| 85 | Extent (1) of AV_DIR1 |
| 86~496 | Extent (2) of AV_DIR1 (not recorded but allocated) |
| 497 | Extent of FILE2.DAT (attribute information) |
| 498 | File entry (FILE2.DAT) |
| 499 | Extent of FILE1.DAT (attribute information) |
| 500 | File entry (FILE1.DAT) |
| 501~600 | Extent of FILE1.DAT (AV stream) |
| 601~700 | Extent of FILE2.DAT (AV stream) |
| 701~Last LBN | Unallocated |

FIG. 16

| LBN | Content of data |
|---|---|
| 0~79 | Space bit map descriptor |
| 80 | File set descriptor |
| 81 | Terminating descriptor |
| 82 | File entry (Root) |
| 83 | Root directory |
| 84 | File entry (AV_DIR1) |
| 85 | Extent (1) of AV_DIR1 |
| 86~250 | Extent (2) of AV_DIR1 (not recorded but allocated) |
| 251~Last LBN | Unallocated |

FIG. 21

| LBN | Content of data |
|---|---|
| 0~79 | Space bit map descriptor |
| 80 | File set descriptor |
| 81 | Terminating descriptor |
| 82 | File entry (Root) |
| 83 | Root directory |
| 84 | File entry (AV_DIR1) |
| 85 | Extent (1) of AV_DIR1 |
| 86~249 | Extent (2) of AV_DIR1 (not recorded but allocated) |
| 250 | File entry (AV_SUB_DIR1) |
| 251 | Extent (1) of AV_SUB_DIR1 |
| 252~400 | Extent (2) of AV_SUB_DIR1 (not recorded but allocated) |
| 401~Last LBN | Unallocated |

FIG. 24

| LBN | Content of data |
|---|---|
| 0~79 | Space bit map descriptor |
| 80 | File set descriptor |
| 81 | Terminating descriptor |
| 82 | File entry (Root) |
| 83 | Root directory |
| 84 | File entry (AV_DIR1) |
| 85 | Extent (1) of AV_DIR1 |
| 86~249 | Extent (2) of AV_DIR1 (not recorded but allocated) |
| 250 | File entry (AV_SUB_DIR1) |
| 251 | Extent (1) of AV_SUB_DIR1 |
| 252~398 | Extent (2) of AV_SUB_DIR1 (not recorded but allocated) |
| 400 | File entry (FILE2.DAT) |
| 401 | File entry (FILE1.DAT) |
| 402~451 | Extent of FILE1.DAT |
| 452~651 | Extent of FILE2.DAT |
| 652~Last LBN | Unallocated |

FIG. 26

| LBN | Content of data |
|---|---|
| 0~79 | Space bit map descriptor |
| 80 | File set descriptor |
| 81 | Terminating descriptor |
| 82 | File entry (Root) |
| 83 | Root directory |
| 84 | File entry (AV_DIR1) |
| 85 | Extent (1) of AV_DIR1 |
| 86~248 | Extent (2) of AV_DIR1 (not recorded but allocated) |
| 249 | File entry (AV_SUB_DIR1) |
| 250 | Extent of AV_SUB_DIR1 |
| 401~Last LBN | Unallocated |

FIG. 28

| LBN | Content of data |
|---|---|
| 0~79 | Space bit map descriptor |
| 80 | File set descriptor |
| 81 | Terminating descriptor |
| 82 | File entry (Root) |
| 83 | Root directory |
| 84 | File entry (AV_DIR1) |
| 85 | Extent (1) of AV_DIR1 |
| 86~245 | Extent (2) of AV_DIR1 (not recorded but allocated) |
| 246 | File entry (AV_SUB_DIR2) |
| 247 | Extent of AV_SUB_DIR2 |
| 248 | File entry (FILE1.DAT) |
| 249 | File entry (AV_SUB_DIR1) |
| 250 | Extent of AV_SUB_DIR1 |
| 251~300 | Extent of FILE1.DAT |
| 301~Last LBN | Unallocated |

FIG. 30

| LBN | Content of data |
|---|---|
| 0~79 | Space bit map descriptor |
| 80 | File set descriptor |
| 81 | Terminating descriptor |
| 82 | File entry (Root) |
| 83 | Root directory |
| 84 | File entry (AV_DIR1) |
| 85 | Extent (1) of AV_DIR1 |
| 86~250 | File management information on an AV file and the like |
| 251~685 | AV file data |
| 686~Last LBN | Unallocated |

FIG. 32

| LBN | Content of data |
|---|---|
| 0~79 | Space bit map descriptor |
| 80 | File set descriptor |
| 81 | Terminating descriptor |
| 82 | File entry (Root) |
| 83 | Root directory |
| 84 | File entry (AV_DIR1) |
| 85 | Extent (1) of AV_DIR1 |
| 86~250 | File management information on an AV file and the like |
| 251~685 | AV file data |
| 686~850 | Extent (3) of AV_DIR1 (not recorded but allocated) |
| 851~Last LBN | Unallocated |

FIG. 34

| LBN | Content of data |
|---|---|
| 0~79 | Space bit map descriptor |
| 80 | File set descriptor |
| 81 | Terminating descriptor |
| 82 | File entry (Root directory) |
| 83 | Root directory |
| 84 | File entry (Dir1 directory) |
| 85 | Dir1 directory |
| 84 | File entry (File1_1) |
| 85~100 | Extent of File1_1 |
| 101 | File entry (File1_2) |
| 102~200 | Extent of File1_2 |
| 201~Last LBN | Unallocated |

FIG. 37 (PRIOR ART)

| BP | Length | Field name | Content |
|---|---|---|---|
| 0 | 16 | Descriptor tag | tag |
| 16 | 20 | ICB tag | icbtag |
| --- | --- | --- | --- |
| 172 | 4 | Length of Allocation Descriptors | Unit32 |
| 176 | L_EA | Extended attributes | bytes |
| a | L_AD | Allocation descriptors | bytes |

FIG. 39 (PRIOR ART)

| BP | Length | Field name | Content |
|----|--------|------------|---------|
| 0 | 4 | Extent length | Unit32 |
| 4 | 4 | Extent position | Unit32 |

FIG. 40 (PRIOR ART)

| Value | Interpretation |
|---|---|
| 0 | Extent recorded and allocated |
| 1 | Extent not recorded but allocated |
| 2 | Extent not recorded and not allocated |
| 3 | The Extent is the next extent of allocation descriptors |

FIG. 41 (PRIOR ART)

| LBN | Content of data |
|---|---|
| 85 | File identifier descriptor (parent directory) |
| | File identifier descriptor (FILE1_1) |
| | File identifier descriptor (FILE1_2) |

FIG. 42 (PRIOR ART)

| BP | Length | Field name | Content |
|---|---|---|---|
| 0 | 16 | Descriptor tag | tag |
| 16 | 20 | ICB tag | icbtag |
| ... | ... | ... | ... |
| 152 | 16 | Stream directory ICB | long_ad |
| ... | ... | ... | ... |
| 172 | 4 | Length of Allocation descriptors | Unit32 |
| 176 | L_EA | Extended attributes | bytes |
| a | L_AD | Allocation descriptors | bytes |

FIG. 44 (PRIOR ART)

| LBN | Content of data |
|---|---|
| --- | File identifier descriptor (parent entry) |
| | File identifier descriptor (named_stream_1) |
| | File identifier descriptor (named_stream_2) |

FIG. 45 (PRIOR ART)

| LBN | Content of data |
|---|---|
| 0~79 | Space bit map descriptor |
| 80 | File set descriptor |
| 81 | Terminating descriptor |
| 82 | File entry (Root directory) |
| 83 | Root directory |
| 84 | File entry (Dir1 directory) |
| 85 | Dir1 directory |
| 86 | File entry (File1_1) |
| 86~100 | Extent of File1_1 |
| 101 | File entry (File1_2) |
| 102~200 | Extent of File1_2 |
| 201 | File entry (File1_3) |
| 202~300 | Extent of File1_3 |
| 301~Last LBN | Unallocated |

FIG. 47 (PRIOR ART)

AV DATA RECORDING APPARATUS AND METHOD, AND DISK RECORDED BY THE SAME

BACKGROUND OF THE INVENTION

1. Field of the Invention

The present invention relates to an AV data recording apparatus and method, suitable for recording/reproducing AV (audio-video) data such as a digital image.

2. Description of the Related Art

In recent years, optical disks are being used as recording media for recording digital images including animation, due to their increased density. Optical disks are applied in a wide range; specifically, they are applied to peripheral equipment of computers, video players for use at home, etc. Furthermore, it is expected that optical disks will be used as recording media, in place of tape media in the future.

In order to handle data for common use in such a wide range of applications, data generally is managed as a logical unit (i.e., file). As an example of such a file management method, there is a file system using a format based on the UDF (Universal Disk Format) standard.

The UDF standard is prescribed so as to ensure medium compatibility among various kinds of computer OSes (Operating Systems). The UDF standard also is used in consumer equipment such as DVD-Video players. Furthermore, it is expected that the UDF standard will be supported over a wider platform in the future.

Hereinafter, the structure of a file system (hereinafter, referred to as a "UDF file system") using the UDF standard will be described with reference to the drawings. FIG. 35 shows an example of a structure of an apparatus for recording/reproducing data adopting a conventional AV data recording method.

In FIG. 35, reference numeral 101 denotes a disk (e.g., a magneto-optical disk), and 102 denotes a recording medium driving section. When the disk 101 is, for example, a magneto-optical disk, the recording medium driving section 102 may be composed of a spindle motor, or the like.

Reference numeral 103 denotes a recording/reproducing section, which is composed of an optical pickup, a magnetic head, a servo circuit, a modulation/demodulation circuit, and the like, when the disk 101 is, for example, a magneto-optical disk. Reference numeral 104 denotes a memory section, which stores data temporarily during recording/reproduction. Reference numeral 105 denotes a disk drive unit, which is composed of the disk 101, the recording medium driving section 102, the recording/reproducing section 103, and the memory section 104.

Reference numeral 106 denotes an AV signal processing section, which subjects an AV input signal (that is input through a CCD camera, for example) to processing such as MPEG compression or subjects AV data read from the disk 101 to processing such as MPEG decoding, and outputs the results to a monitor or the like.

Furthermore, reference numeral 107 denotes a system control section, which controls the AV signal processing section 106 and the disk drive unit 105.

When data is recorded in an apparatus for recording/reproducing data thus constructed, an AV signal input to the AV signal processing section 106 is subjected to image compression in accordance with the MPEG system or the like, and transferred to the memory section 104 under the control of the system control section 107.

Next, the system control section 107 operates the recording medium driving section 102 and the recording/reproducing section 103 to record data in the memory section 104 onto the disk 101.

For reproduction of data, the system control section 107 operates the recording medium driving section 102 and the recording/reproducing section 103 to transfer data recorded on the disk 101 to the memory section 104.

Then, the data in the memory section 104 is read under the control of the system control section 107, and is output from the AV signal processing section 106 as an AV signal.

Next, an example of a structure of the UDF file system that is a conventional file management method will be described with reference to the drawings. FIG. 36 shows the structure in a volume space of the UDF formed on the disk 101.

In FIG. 36, in order to handle the disk 101 as a logical volume, the disk 101 is divided into units called sectors, and the sectors are assigned logical sector numbers (LSNs) from 0 (Zero) to a last logical number (Last LSN). In a leading portion and a trailing portion of the volume space, a volume structure is recorded, respectively. Furthermore, a partition space is allocated between the volume structures. In the partition space, file structure information and a file (i.e., user data) are recorded.

In the partition space, logical block numbers (LBNs) are allocated in a range of 0 (Zero) to a last logical block number (Last LBN) from a leading sector on a sector basis. FIG. 37 shows a structure of the partition space when a directory structure shown in FIG. 38 is recorded on the disk 101.

As shown in FIG. 38, a directory Dir1 is present under a root directory, and File1_1 and File1_2 are present under the directory Dir1. In this case, in FIG. 37, a space bitmap descriptor is recorded in LBN=0 to 79.

The space bitmap descriptor has a space bitmap showing whether or not each logical block is allocatable. Each bit of the space bitmap corresponds to a respective logical block. When a bit value is "1", its corresponding logical block is unallocated, and when a bit value is "0", its corresponding logical block is allocated.

In LBN=80, a file set descriptor is recorded. In the file set descriptor, positional information of a file entry of the root directory is recorded. The file entry will be described in detail later.

In LBN=81, a terminating descriptor is recorded. The terminating descriptor represents an end of a file set descriptor string.

In LBN=82, a file entry of the root directory is recorded. The file entry is used for storing various pieces of attribute information specific to each file, information on the recorded position and size of each file, and the like, and managing each file as a group of extents. The extent will be described in detail later.

FIG. 39 shows a structure of the file entry. In a descriptor tag field, information is recorded for identifying various kinds of descriptors such as a space bitmap descriptor, a file set descriptor, and a file entry in the partition space. In the case of the file entry, "261" is described. In an ICB (Information Control Block) tag field, attribute information on the file entry itself is recorded. An extended attribute field is used for describing attribute information other than that prescribed in an attribute information field in the file entry. In an allocation descriptor field, the required number of allocation descriptors are recorded for managing a region of continuous logical blocks as one extent.

FIG. 40 shows a structure of the allocation descriptor. In the allocation descriptor, an extent is represented by an extent length and an extent position.

FIG. 41 shows interpretation of the 2 most significant bits of the extent length included in the allocation descriptor. An allocated state and a recorded state of the extent are represented by the value of the 2 most significant bits. The value "0" represents an extent recorded and allocated, and file data is recorded therein. The value "1" represents an extent not recorded but allocated, and its region is allocated to a particular file/directory; however, no data is recorded therein. The value "2" represents an extent not recorded and not allocated, and no data is recorded therein. The value "3" represents the extent that is the next extent of the allocation descriptors. In the allocation descriptor field of the file entry, a plurality of allocation descriptors can be recorded, and collection of extents managed by these allocation descriptors form one file. The extents forming a file are called a main data stream, in which user data is stored.

In a directory, a name of a file included in the directory, and positional information on a file entry thereof are recorded. In the UDF, a directory also is a kind of a file. Referring to FIG. 37, directories are recorded in LBN=83 and LBN=85.

FIG. 42 shows an example of a structure of a directory file recorded in LBN=85. The directory file is composed of a plurality of file identifier descriptors, and each file identifier descriptor has information on each file included in the directory. The main information associated with each file identifier descriptor includes a name of a file to which the file identifier descriptor corresponds and positional information on a file entry thereof. FIG. 43 shows an example of the logical structure of a directory/file in file management information in accordance with the UDF standard.

In FIG. 43, the file set descriptor is recorded at a predetermined position in the partition space as a part of file management information. In the file set descriptor, a recorded position of the file entry of the root directory file is stored. In the file identifier descriptor of the root directory file, a recorded position of the file entry of the directory Dir1 is stored. In a file under the directory Dir1, a plurality of file identifier descriptors are present, and file names and recorded positions of file entries of FILE1_1 and FILE1_2 are stored, respectively.

Furthermore, according to the UDF, an extended file entry can be used in place of the above-mentioned file entry. FIG. 44 shows an example of a structure of an extended file entry. In the UDF standard, in a descriptor tag field of the extended file entry, "266" is described.

The extended file entry is different from the file entry, in that the extended file entry has a stream directory ICB field. In the stream directory ICB, positional information on a file entry for describing a special directory called a stream directory is stored.

FIG. 45 shows an example of a structure of the stream directory. The stream directory also is a kind of a directory file, and is composed of a plurality of file identifier descriptors in the same way as in a general directory file.

The stream directory file is different from a general directory file, in that a file identifier descriptor in the stream directory is related to a special file called a named data stream.

Furthermore, in the stream directory, a main data stream is referred to as a parent entry, in place of a parent directory.

In the case of the named data stream, the collection of extents managed by allocation descriptors in an extended file entry also forms one data stream.

Accordingly, a file managed by an extended file entry is composed of one main data stream, or one main data stream and at least one named data stream.

FIG. 46 shows an example of a directory/file logical structure when an extended file entry is used in accordance with the UDF standard. In FIG. 46, the relationship among a file set descriptor, a root directory, a directory Dir1, and files FILE1_1 and FILE_2 is the same as that shown in FIG. 43, except that an extended file entry is used in place of a file entry.

Referring to FIG. 44, in the stream directory ICB field of the extended file entry, a recorded position of a file entry in the stream directory is stored.

In a file under the stream directory, a plurality of file identifier descriptors are present, and names and recorded positions of extended file entries of named_stream_1 and named_stream_2 are stored in the respective file identifier descriptors.

Referring to FIG. 46, in the directory Dir1, three data streams: a directory file (main data stream), and named_stream_1 and named_stream_2 (named data streams) form one file.

Hereinafter, an operation of an apparatus for recording/reproducing data will be described, in which a desired file is read from a disk having a structure in accordance with the above-mentioned UDF file system.

An operation of obtaining a recorded position of an intended file in a hierarchical structure as shown in FIG. 43 will be described. It is assumed that a file FILE1_1 is the intended one.

First, the content of a root directory file is read. More specifically, a position of a file entry of the root directory is obtained by referring to a file set descriptor. Then, an allocation descriptor is read from the file entry to obtain the position and length of an extent of the root directory file, and data of the root directory file are read. By scanning information on the root directory file thus obtained, a file identifier descriptor matched with an intended directory name Dir1 can be detected.

Then, the content of the intended directory file is read. More specifically, when a file identifier descriptor matched with an intended directory is detected, positional information of a file entry is obtained from the content of the file identifier descriptor, and the file entry is read. An allocation descriptor is read from the file entry regarding the intended directory to obtain the position and length of an extent recorded in the allocation descriptor, and data of the directory file are read.

Finally, in order to read an intended file, data in a file under the directory Dir1 are scanned to detect a file identifier descriptor matched with an intended file name FILE1_1. When a file identifier descriptor matched with the intended file name is detected, positional information of a file entry is obtained from the file identifier descriptor, and a file entry thereof is read. An allocation descriptor is read from the file entry to obtain the position and length of an extent recorded in the allocation descriptor, and data of the intended file FILE1_1 is read.

Next, an operation of an apparatus for recording/reproducing data will be described, in which data are recorded on a disk having a structure based on the UDF file system. Herein, the case will be described where FILE1_3 is further recorded in the directory Dir1 with respect to a disk having the partition space shown in FIG. 37.

First, a space bitmap is scanned, and an unallocated logical block with a bit "1" is obtained. Data of FILE1_3 is recorded as an extent in the unallocated logical block. When recording of the extent is completed, a file entry indicating FILE1_3 is recorded in the unallocated logical block.

At this time, positional information on the extent indicating FILE1_3 and the extent length are recorded in the file entry as a required number of allocation descriptors. A file identifier descriptor indicating FILE1_3 is recorded in a file of a directory Dir1 that is a parent directory of FILE1_3.

In the file identifier descriptor, a file name of FILE1_3 and positional information of the file entry thereof are recorded. A bit in the space bitmap corresponding to a sector that has been allocated by the above processing is set at "0" so as to be in an allocated state.

FIG. 47 shows a logical volume space obtained as a result of the above processing. The order of processing with respect to file management information is not particularly limited to the above example. The processing may be performed in a different order.

Hereinafter, an operation of an apparatus for recording/reproducing apparatus will be described in which a desired named data stream is read from a disk having a structure based on the UDF file system. Herein, an operation of obtaining a recorded position of an intended named data stream in a hierarchical structure as shown in FIG. 46 will be described. In FIG. 46, it is assumed that named_stream_1 is the intended data stream.

An operation of reading a file entry of a directory Dir1 that is a parent directory of the named data stream named_stream_1 is as described above.

A stream directory ICB is read from an extended file entry of the directory Dir1, and an extended file entry of a stream directory recorded therein is obtained.

Then, an allocation descriptor is read from the extended file entry to obtain the position and length of an extent of the stream directory, and data of the stream directory file is read.

Information on the obtained stream directory is scanned, whereby a file identifier descriptor matched with the name of the intended named data stream (i.e., named_stream_1) can be detected.

Positional information of an extended file entry is obtained from the content of the file identifier descriptor, and the extended file entry is read.

An allocation descriptor is read from the extended file entry regarding the named data stream to obtain the position and length of an extent recorded therein, and data of an intended named data stream (named_stream_1) is read.

A named data stream also is recorded in the same way as in a file, except that a file identifier descriptor for storing a recorded position of an extended file entry of the named data stream is recorded in a stream directory file.

The order of processing with respect to the named data stream is not particularly limited to the above example, and the processing may be performed in a different order.

However, the above-mentioned file management method using the UDF has the following problem. More specifically, according to the UDF, a directory is recorded as a file in a partition space, and a file entry also is recorded in the partition space. Therefore, the directory file and the file entry may be distributed on a disk. Thus, in the case where it is attempted to read all the files under a certain directory, when a directory file and a file entry are distributed, seeking occurs often with respect to a disk.

For example, referring to FIG. 47, file entries of FILE1_1, FILE1_2, and FILE1_3 are distributed; therefore, seeking cannot be avoided for reading them. When a file to be reproduced is the one which requires real time reproduction, such as an AV file, reproduction of the file may be difficult due to the occurrence of seeking.

Similarly, in the case where real time recording is required as in an AV file and the like, when a file entry is recorded after AV data is recorded, seeking occurs with respect to a disk, and recording of AV data during this time stops. This also applies to the case where a large amount of still image files and the like subjected to JPEG compression are recorded and browsed through.

It is conceivable to reduce seeking with respect to a disk by reading all the file management information to a memory and performing on-memory processing, upon activation of an apparatus. Even in this case, seeking occurs a number times, which prolongs an activation time. Furthermore, a required memory capacity cannot be expected previously; therefore, it is difficult to construct a system in which a calculator resource is disposed efficiently.

SUMMARY OF THE INVENTION

Therefore, with the foregoing in mind, it is an object of the present invention to provide an AV data recording apparatus and method capable of minimizing seeking even in the case of using the UDF file system.

In order to achieve the above-mentioned object, the AV data recording apparatus of the present invention, includes: a disk as a recording medium for AV data; a recording medium driving section for driving the disk; a recording/reproducing section for recording data onto the disk/reproducing the data from the disk; a memory section for storing data temporarily; an AV signal processing section for performing conversion between an AV signal and a digital signal; and a system control section for controlling a recording method, wherein the apparatus has file management information for managing continuous blocks on the disk as an extent, and dividing the extent into groups so as to manage the extent as a file in the system control section, and a new directory is created on the disk, and the extent that has been allocated is kept as a reservation region for recording the file management information.

Because of the above-mentioned structure, even in the case of using the UDF, file management information of a file to be recorded is not distributed on a disk, and seeking with respect to a disk can be minimized. Therefore, recording can be performed with high reliability at a high speed. Furthermore, by allocating a reservation region, other information can be prevented from being recorded therein.

Furthermore, it is preferable that the reservation region is a part of a main data stream.

Furthermore, it is preferable that the reservation region is a part of a named data stream.

Furthermore, it is preferable that, when the file is recorded on the disk, attribute information of the file is recorded in the reservation region.

Furthermore, it is preferable that the file is a transport stream of MPEG, and the attribute information of the file recorded in the reservation region is a private stream containing a time map table of a transport stream. In this case, special reproduction such as fast-forward reproduction and fast-backward reproduction, reproduction at a specified time, and the like can be performed easily.

Furthermore, it is preferable that the file is an Exif image file, and the attribute information of the file recorded in the reservation region is additional information of the Exif image file. Since thumbnail information and the like are contained in the additional information, thumbnail information and the like can be reproduced at a high speed by reading only the additional information.

Furthermore, it is preferable that the reservation region is kept by recording the file management information of the file previously. In this case, it is not required to scan a non-recorded region during recording of a file, so that seeking can be reduced.

Furthermore, it is preferable that, when a new subdirectory is created under the directory, an allocated extent is kept as a reservation region for recording the file management information of the file in the subdirectory. In this case, the same effect can be expected even when an AV file is recorded in the subdirectory.

Furthermore, it is preferable that, when a new subdirectory is created under the directory, a directory file of the subdirectory is recorded in the reservation region. This is because seeking can be reduced even in the case of recording an AV file in the subdirectory.

Furthermore, it is preferable that, when the directory is created, a defective block in the reservation region is detected, and the defective block is skipped. In this case, the continuity of data to be recorded in the reservation region is not impaired, so that recording can be performed with high reliability.

Furthermore, it is preferable that, in a case where the file is recorded on the disk, when a capacity of the reservation region becomes insufficient, another reservation region different from the first reservation region is kept in a continuous region on the disk to record the file. In this case, by minimizing seeking, recording/reproduction of AV data can be prevented from being suspended.

Furthermore, it is preferable that, in a case where a thumbnail file containing a thumbnail image of the file is recorded on the disk, the thumbnail file is recorded in the reservation region. In this case, since seeking does not occur, even a thumbnail image with a large capacity containing a plurality of pieces of image data can be displayed at a high speed.

In order to achieve the above-mentioned object, the AV data recording method has file management information for managing continuous blocks on a disk as an extent, and dividing the extent into groups so as to manage the extent as a file, wherein a new directory is created on the disk, and the extent that has been allocated is kept as a reservation region for recording the file management information.

Because of the above-mentioned structure, even in the case of using the UDF, file management information of a file to be recorded is not distributed in a disk, and seeking with respect to a disk can be minimized. As a result, recording can be performed with high reliability at a high speed. Furthermore, by allocating the reservation region, other information can be prevented from being recorded.

Furthermore, it is preferable that the reservation region is a part of a main data stream.

Furthermore, it is preferable that the reservation region is a part of a named data stream.

Furthermore, it is preferable that, when the file is recorded onto the disk, attribute information of the file is recorded in the reservation region.

Furthermore, it is preferable that the file is a transport stream of MPEG, and the attribute information of the file recorded in the reservation region is a private stream containing a time map table of a transport stream. In this case, special reproduction such as fast-forward reproduction and fast-backward reproduction, reproduction at a specified time, and the like can be performed easily.

Furthermore, it is preferable that the file is an Exif image file, and the attribute information of the file recorded in the reservation region is additional information of the Exif image file. Since thumbnail information and the like are contained in the additional information, thumbnail information and the like can be reproduced at a high speed by reading only the additional information.

Furthermore, it is preferable that the reservation region is kept by recording the file management information of the file previously. In this case, it is not required to scan a non-recorded region during recording of a file, so that seeking can be reduced.

Furthermore, it is preferable that, when a new subdirectory is created under the directory, an allocated extent is kept as a reservation region for recording file management information of the file in the subdirectory. In this case, the same effect can be expected even when an AV file is recorded in the subdirectory.

Furthermore, it is preferable that, when a new subdirectory is created under the directory, a directory file of the subdirectory is recorded in the reservation region. This is because seeking can be reduced even in the case of recording an AV file in the subdirectory.

Furthermore, it is preferable that, when the directory is created, a defective block in the reservation region is detected, and the defective block is skipped. In this case, the continuity of data to be recorded in the reservation region is not impaired, so that recording can be performed with high reliability.

Furthermore, in a case where the file is recorded onto the disk, when a capacity of the reservation region becomes insufficient, another reservation region different from the reservation region is kept in a continuous region on the disk to record the file. In this case, by minimizing seeking, recording/reproduction of AV data can be prevented from being suspended.

Furthermore, it is preferable that, in a case where a thumbnail file containing a thumbnail image of the file is recorded onto the disk, the thumbnail file is recorded in the reservation region. In this case, since seeking does not occur, even thumbnail image with a large capacity containing a plurality of pieces of image data can be displayed at a high speed.

These and other advantages of the present invention will become apparent to those skilled in the art upon reading and understanding the following detailed description with reference to the accompanying figures.

BRIEF DESCRIPTION OF THE DRAWINGS

FIG. 3 illustrates an initial partition space in the AV data recording apparatus in Embodiment 1 of the present invention.

FIG. 5 illustrates a partition space after an AV file is recorded in the AV data recording apparatus in Embodiment 1 of the present invention.

FIG. 7 illustrates an initial partition space in the AV data recording apparatus in Embodiment 2 of the present invention.

FIG. 9 illustrates an initial partition space in the AV data recording apparatus in Embodiment 3 of the present invention.

FIG. 14 illustrates an initial partition space in the AV data recording apparatus in Embodiment 4 of the present invention.

FIG. 16 illustrates a partition space after an AV file is recorded in the AV data recording apparatus in Embodiment 4 of the present invention

FIG. 21 illustrates an initial partition space in the AV data recording apparatus in Embodiment 6 of the present invention.

FIG. 24 illustrates a partition space after a subdirectory is created in the AV data recording apparatus in Embodiment 6 of the present invention.

FIG. 26 illustrates a partition space after an AV file is recorded in the AV data recording apparatus in Embodiment 6 of the present invention.

FIG. 28 illustrates a partition space after a subdirectory is created in the AV data recording apparatus in Embodiment 7 of the present invention.

FIG. 30 illustrates a partition space after an AV file is recorded in a subdirectory in the AV data recording apparatus in Embodiment 7 of the present invention.

FIG. 32 illustrates a partition space before a new AV reservation region is kept in an AV data recording apparatus in Embodiment 10 of the present invention.

FIG. 34 illustrates a partition space after a new AV reservation region is kept in the AV data recording apparatus in Embodiment 10 of the present invention.

FIG. 37 illustrates a partition space in the conventional AV data recording apparatus.

FIG. 39 illustrates a file entry in the conventional AV data recording apparatus.

FIG. 40 illustrates an allocation descriptor in the conventional AV data recording apparatus.

FIG. 41 illustrates interpretation of an extent length in the conventional AV data recording apparatus.

FIG. 42 illustrates a structure of a directory file in the conventional AV data recording apparatus.

FIG. 44 illustrates an extended file entry in the conventional AV data recording apparatus.

FIG. 45 illustrates a structure of a stream directory file in the conventional AV data recording apparatus.

FIG. 47 illustrates a partition space after recorded in the conventional AV data recording apparatus.

DESCRIPTION OF THE PREFERRED EMBODIMENTS

Hereinafter, embodiments of an AV data recording apparatus of the present invention will be described with reference to the drawings. In the following description, a file containing voice data and video data encoded in accordance with the MPEG system, the JPEG system, or the like will be referred to as an "AV file". In the present specification, disks collectively refer to recording media having a disk shape, such as an optical disk, a hard disk, and the like (e.g., DVD-RAM, MO, DVD-R, DVD-RW, DVD+RW, etc.).

Embodiment 1

Figure 1:
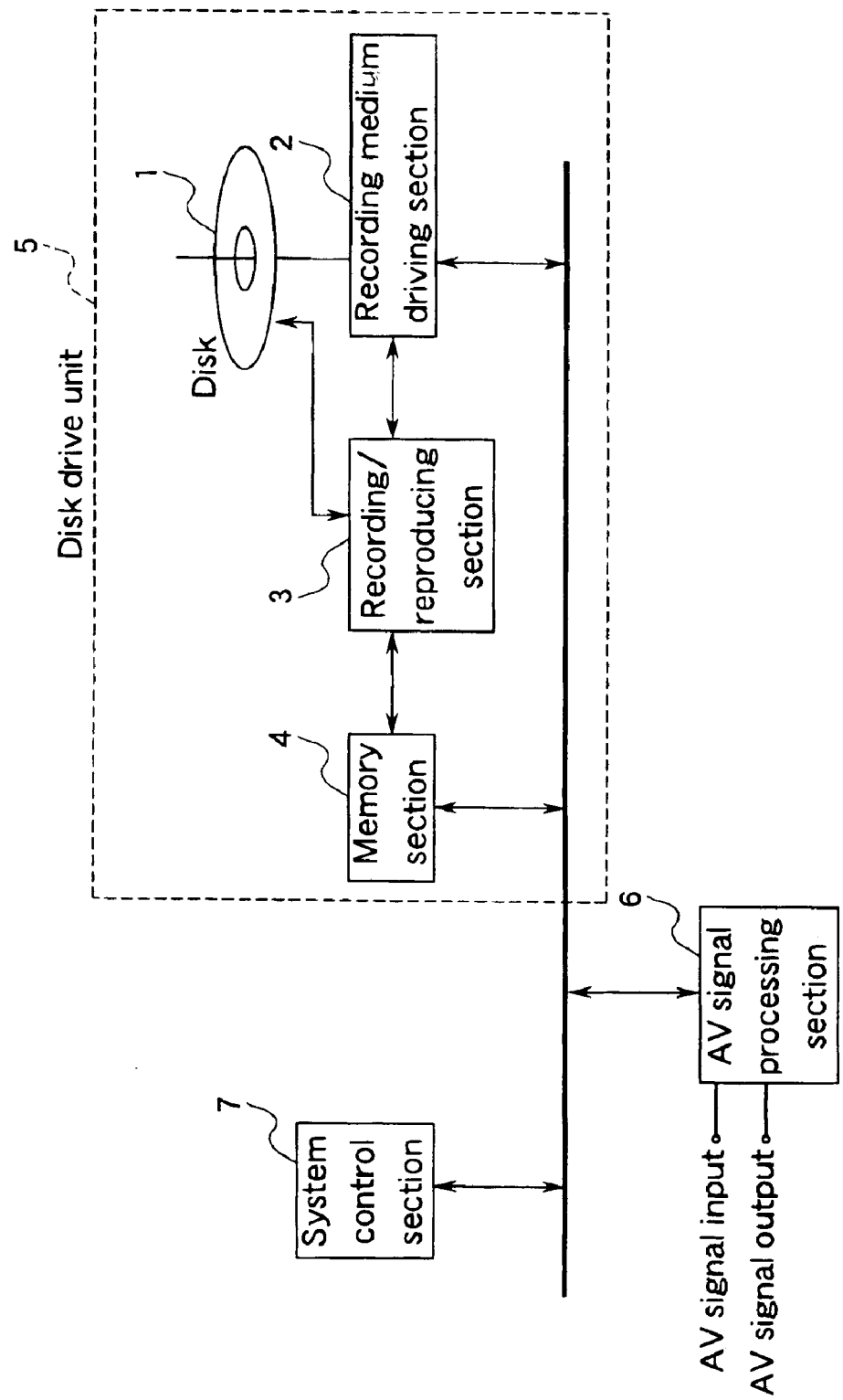
FIG. 1 shows a structure of an AV data recording apparatus in Embodiment 1 of the present invention.

FIG. 1 shows the structure of an AV data recording apparatus in Embodiment 1 of the present invention. In FIG. 1, reference numeral 1 denotes a disk (e.g., a magneto-optical disk), and 2 denotes a recording medium driving section, which may be composed of a spindle motor, or the like, when the disk 1 is, for example, a magneto-optical disk.

Reference numeral 3 denotes a recording/reproducing section. When the disk 1 is, for example, a magneto-optical disk, the recording/reproducing section 3 is composed of an optical pickup, a magnetic head, a servo circuit, a modulation/demodulation circuit, and the like. Reference numeral 4 denotes a memory section, which temporarily stores data during recording/reproduction. Reference numeral 5 denotes a disk drive unit, which is composed of the disk 1, the recording medium driving section 2, the recording/reproducing section 3 and the memory section 4.

Reference numeral 6 denotes an AV signal processing section, which subjects an AV input signal (that is input from a CCD camera, for example) to processing such as MPEG compression or subjects AV data read from the disk medium to processing such as MPEG decoding, and outputs the results to a monitor or the like. Reference numeral 7 denotes a system control section, which controls the AV signal processing section 6 and the disk drive unit 5.

When data is recorded in an AV data recording apparatus thus constructed, an AV signal input to the AV signal processing section 6 is subjected to image compression processing based on the MPEG system, and transferred to the memory section 4 under the control of the system control section 7. Next, the system control section 7 operates the recording medium driving section 2 and the recording/reproducing section 3 to record data in the memory section 4 onto the disk 1.

When data is reproduced, the system control section 7 operates the recording medium driving section 2 and the recording/reproducing section 3 to transfer data recorded on the disk 1 to the memory section 4. Then, the data in the memory section 4 is read under the control of the system control section 7, and is output from the AV signal processing section 6 as an AV signal.

Figure 2:
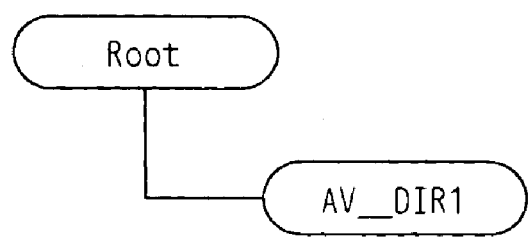
FIG. 2 illustrates an initial directory structure in the AV data recording apparatus in Embodiment 1 of the present invention.

FIG. 2 illustrates a file/directory structure immediately after a directory for recording an AV file is created in Embodiment 1 of the present invention. In FIG. 2, Root surrounded by an ellipse represents a root directory, and AV_DIR1 represents a directory for recording an AV file, respectively.

FIG. 3 illustrates a data structure in a partition space in which the directory structure shown in FIG. 2 is recorded on a disk used in the AV data recording apparatus in Embodiment 1 of the present invention. In FIG. 3, in LBN=0 to 79, a space bitmap descriptor is recorded. LBN=251 to Last is "unallocated". Therefore, bits corresponding to the sectors therein are set at "1".

Furthermore, in LBN=80, a file set descriptor is recorded. When a file entry is that of the root directory, positional information thereof is recorded in the file set descriptor. Furthermore, in LBN=81, a terminating descriptor is recorded.

Furthermore, a file entry of the root directory, a directory file of the root directory, and a file entry of the directory AV_DIR1 are recorded in LBN=82, LBN=83, and LBN=84, respectively.

LBN=85 is an extent (1) in which a directory file of the directory A_DIR1 is recorded. Similarly, LBN=86 to 250 is an extent (2) of the directory AV_DIR1. The value of the 2 most significant bits of an allocation descriptor is determined so that the extent (2) is "not recorded" but "allocated". Thus, in an operation of a conventional file system, data cannot be written in LBN=86 to 250. Hereinafter, the extent (2) will be referred to as an "AV reservation region".

Since LBN=0 to 250 is "allocated" as described above, corresponding bits in the space bitmap are set at "0" (Zero).

In Embodiment 1, the capacity of the "not recorded" but "allocated" extent in the directory AV_DIR1 in an initial state of the recording medium is previously determined. Because of this, in recording/reproduction with respect to the disk 1 as shown in FIG. 4 (Step S401), a system structure is obtained in which the content of LBN=0 to 250 on the disk 1 is read to the memory section 4, and seeking during recording/reproduction can be reduced.

Figure 4:
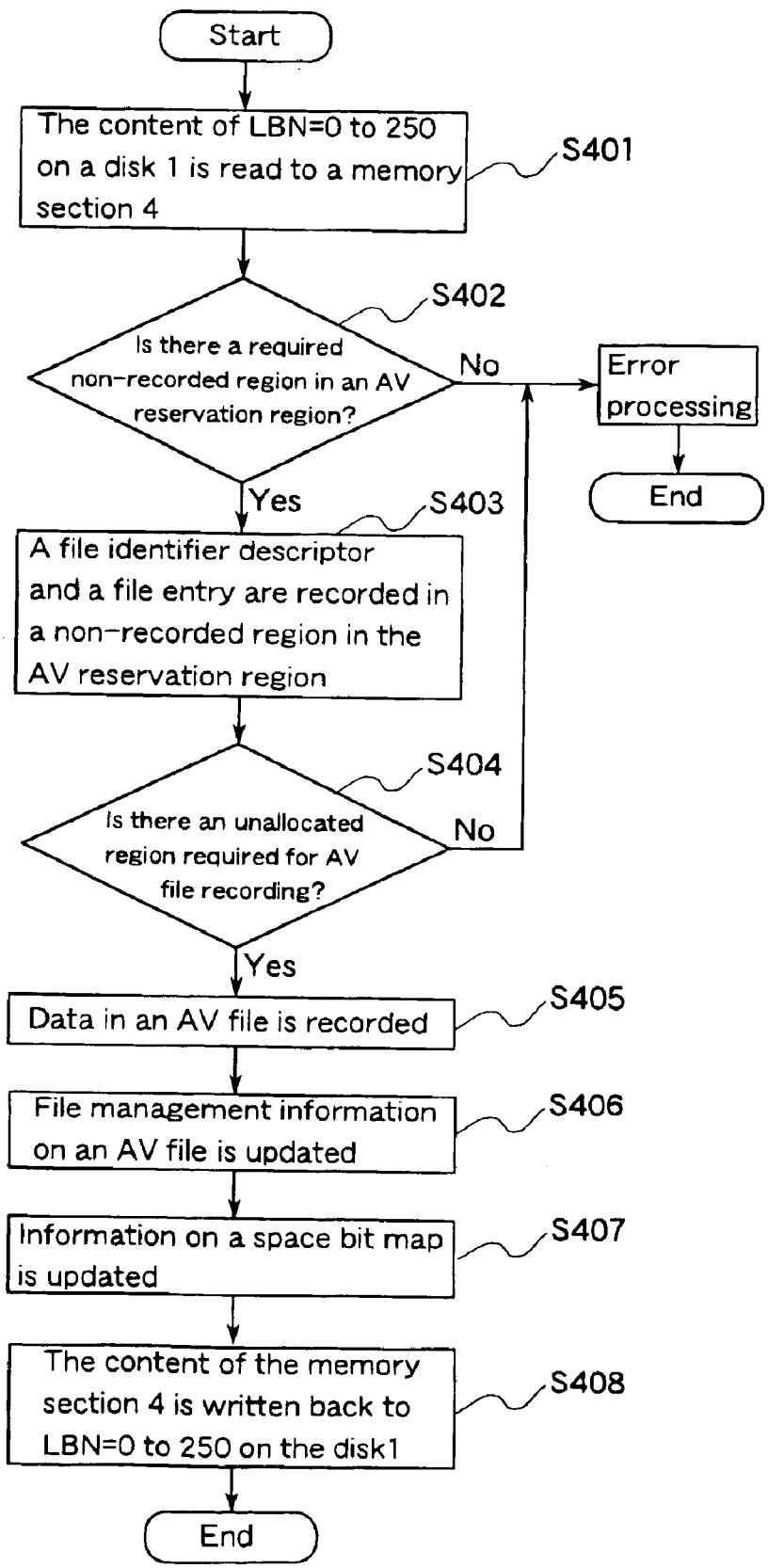
FIG. 4 is a flow chart showing recording processing of an AV file in the AV data recording apparatus in Embodiment 1 of the present invention.

FIG. 4 is a flow chart showing the process of recording an AV file onto a disk having the above-mentioned data structure. When an AV file starts being recorded in accordance with a user's instruction or the like, the content of LBN=0 to 250 on the disk 1 is read to the memory section 4 (Step S401). Then, information in the AV reservation region in the memory section 4 is scanned to determine whether or not there is a non-recorded region sufficient for newly recording a file identifier descriptor and a file entry (Step S402). If it is determined that there is not a sufficient non-recorded region (Step S402: No), error processing is performed, and recording of an AV file is ended. If it is determined that there is a sufficient non-recorded region, a file identifier descriptor and a file entry are recorded in a non-recorded region in the AV reservation region in the memory section 4 (Step S403).

At this time, the size of the extent of the directory AV_DIR1 is changed due to recording of the file identifier descriptor and the file entry, so that an allocation descriptor of the file entry of the directory AV_DIR1 is rewritten in accordance with the change. More specifically, the extent length of the extent (1) is changed by addition of the file identifier descriptor, and a portion in which the file entry has been recorded is excluded from the extent (2).

Next, the space bitmap in the memory section 4 is scanned to determine whether or not there are the required number of unallocated logical blocks for recording an AV file (Step S404). If it is determined that there are no required number of unallocated logical blocks (Step S404: No), error processing is performed, and recording of an AV file is ended. When it is determined that there are the required number of unallocated logical blocks, data are recorded in logical blocks on the recording medium corresponding to the unallocated region obtained in Step S404 (Step S405).

When recording of AV file data is completed, in order to update the file management information of an AV file, information on the position and length of the extent of the AV file is recorded in an allocation descriptor in the file entry in the memory section 4 created in Step 403 (Step S406). Furthermore, required information such as a file name and a file creation time also are updated with respect to the file identifier descriptor and the file entry, in addition to the allocation descriptor.

Next, with respect to the space bitmap in the memory section 4, bits corresponding to the logical blocks in which data has been recorded in Step 405 are changed to "1" representing an "allocated" state (Step S407). Then, the content of the memory section 4 is written back to LBN=0 to 250 on the disk 1 (Step S408). Thus, an AV file is recorded in the directory AV_DIR1.

In the case of recording a plurality of AV files continuously, in the flow chart in FIG. 4, Steps S402 to S407 are repeated after Step S401 until recording of all the AV files is completed, and after recording of all the AV files is completed, a process should proceed to Step S408.

Because of this, it is not required to write a file identifier descriptor and a file entry onto a recording medium every time a file is created, and seeking can be reduced substantially.

FIG. 5 shows a data structure in the partition space after FILE1.DAT and FILE2.DAT that are AV files are recorded in the directory AV_DIR1 in accordance with the flow chart shown in FIG. 4. Herein, in the AV reservation region, logical blocks are used for recording new file entries in the decreasing order of LBN. On the other hand, a file identifier descriptor is added to the end of the extent (1) that is a recorded extent of the directory AV_DIR1. Since the file identifier descriptor and the file entry both have a data structure with a variable length, it is desirable that the file identifier descriptor is recorded in the increasing order of LBN in the AV reservation region, and the file entry is recorded in the decreasing order of LBN.

In the case where there is an insufficient capacity in the extent (1) for describing a file identifier descriptor as a result of addition of a file, the allocation descriptor in the directory AV_DIR1 is corrected so that a block adjacent to the extent (1) in the AV reservation region is included in the extent (1), and a file identifier descriptor should be recorded therein. Addition of a file entry and a file identifier descriptor with respect to the AV reservation region is not limited to the above procedure. For example, it may be possible to divide the AV reservation region into two, and to use a region with the smaller LBN for recording a file identifier descriptor and record a file entry from the leading edge of the remaining region. In this case, the upper limit of the data length recorded in the file identifier descriptor is determined previously, for example, by previously determining the length of a name of a file to be recorded, and the capacity allocation for dividing the AV reservation region is determined.

A recorded AV file is reproduced from the disk shown in FIG. 5 in the following manner. First, in the same way as in Step 401 shown in FIG. 4, the content of LBN=0 to 250 on the disk 1 is read to the memory section 4. Then, the recorded extent of the directory AV_DIR1 is scanned to obtain a name of a file present under the directory AV_DIR1.

Then, data in the file is accessed by the procedure described in the prior art to be reproduced. In the case where the subsequent file is reproduced continuously, the file identifier descriptors and file entries of all the files present under the directory AV_DIR1 are read to the memory section 4. Thus, in reproducing AV files under the directory AV_DIR1 the extents of the files to be reproduced can be accessed directly, and files can be reproduced continuously at a high speed without seeking with respect to a file entry, as occurred according to the conventional method.

Such continuous reproduction is realized easily by performing recording in accordance with the processing procedure shown in FIG. 4. If the recording procedure of the present invention is not used, it is unclear in which logical block in the partition space an entry of an AV file recorded in the directory AV_DIR1 is recorded. Similarly, the operation of reading data to the memory section 4 is realized easily at a high speed by performing recording in accordance with the processing procedure shown in FIG. 4. If the recording procedure of the present invention is not used, although it is possible to read data to the memory section 4, seeking occurs a number of times at the beginning of a recording/reproduction operation.

The recording procedure is not limited to the one shown in FIG. 4. For example, as described in WO 98/14938, the following may be possible: a plurality of available continuous regions are kept prior to recording of actual data; these regions are registered in the space bitmap as "an allocated state"; and thereafter, actual data start to be recorded.

Furthermore, information on the allocation descriptor of the directory AV_DIR1 and the space bitmap may be updated collectively after recording of file data is completed.

Furthermore, the data structure in the partition space on a disk is initialized as shown in FIG. 3 prior to recording of an AV file, when required.

A directory/file name in which an AV file is to be recorded is not limited to that described in Embodiment 1. Another directory/file name may be used.

In Embodiment 1, the content of LBN=0 to 250 is read to the memory section 4 during recording/reproduction. However, all the information is not required to be kept in the memory section 4. Only required information may be kept during recording/reproduction, and only information that needs to be updated may be written back to the disk 1.

By keeping LBN=86 to 250 as a "not recorded" but "allocated" extent of the directory AV_DIR1, LBN=86 to 250 is set to be an AV reservation region. However, the recorded position and capacity of the AV reservation region are not limited to LBN=0 to 250. Another recorded position and capacity may be used as long as they are kept as continuous regions on the disk.

In Embodiment 1, the case using a file entry has been described. However, an extended file entry may be used. In the case of using an extended file entry, the AV reservation region may be kept as a part of the extent of a named data stream of the directory AV_DIR1. In this case, the extent forming the AV reservation region may be set to be an "allocated" and "recorded" extent.

Embodiment 2

Hereinafter, an AV data recording apparatus in Embodiment 2 of the present invention will be described with reference to the drawings. In Embodiment 1, a file identifier descriptor and a file entry of an AV file to be newly recorded are recorded in a "not recorded" but "allocated" extent of the directory AV_DIR1. In contrast, in Embodiment 2, a management file to store information for managing an AV file is created under the directory AV_DIR1, and the management file is allowed to have a "not recorded" but "allocated" extent.

Figure 6:
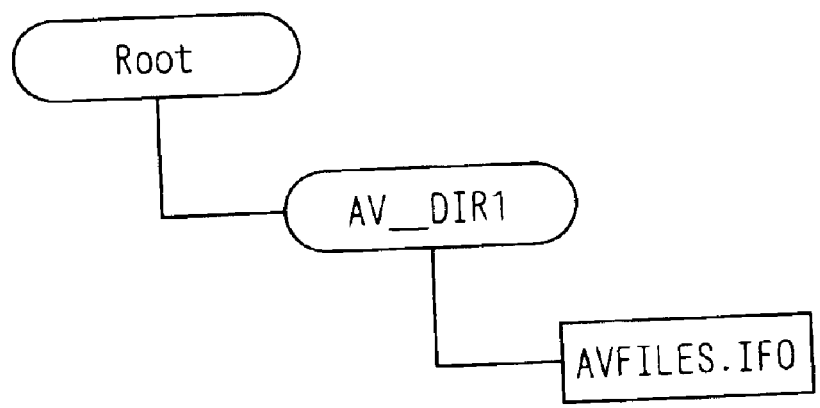
FIG. 6 illustrates an initial directory structure in the AV data recording apparatus in Embodiment 2 of the present invention.

FIG. 6 illustrates a file/directory structure immediately after a directory for recording an AV file is created in the AV data recording apparatus in Embodiment 2 of the present invention. The file/directory structure shown in FIG. 6 is different from the directory structure shown in FIG. 2, in that a management file (AVFILES.IFO) is present under the directory AV_DIR1.

FIG. 7 illustrates a data structure in a partition space when a directory for recording an AV file is recorded. In FIG. 7, in LBN=0 to 79, a space bitmap descriptor is recorded. Since LBN=251 to Last is "unallocated", bits corresponding to the sectors therein are set at "1".

In LBN=80, a file set descriptor is recorded. When the file entry therein is that of the root directory, positional information is recorded in the file set descriptor.

Furthermore, a terminating descriptor, a file entry of the root directory, a directory file of the root directory, a file entry of the directory AV_DIR1, and a file entry of the AVFILES.IFO file are recorded in LBN=81, LBN=82, LBN=83, LBN=84, and LBN=85, respectively.

LBN=86 is an extent in which a directory file of the directory AV_DIR1 is recorded. LBN=87 to 250 is an extent of the AVFILES.IFO file. The value of the 2 most significant bits of an allocation descriptor is set so that the extent is "not recorded" but "allocated". Thus, this region becomes an AV reservation region in Embodiment 2.

When an AV file is recorded on a disk having the above-mentioned data structure, a processing procedure similar to that shown in FIG. 4 can be performed. However, the processing procedure in Embodiment 2 is different from that in Embodiment 1, in that the AV reservation region for recording a new file identifier descriptor and a file entry is a "not recorded" but "allocated" extent of AVFILES.IFO, which is a management file.

When an AV file is reproduced from a disk, a procedure similar to that described in Embodiment 1 can be performed. In Embodiment 2, no data is recorded in the AVFILES. IFO file in an initial state; however, it may be possible that attribute information and the like on the directory AV_DIR1 are recorded in an initial state, and the AVFILES.IFO file is allowed to have an "allocated" and "recorded" extent, as well as a "not recorded" but "allocated" extent. Furthermore, the "allocated" and "recorded" extent may be set to be an AV reservation region.

In Embodiment 2, the case using a file entry has been described. However, an extended file entry may be used. In the case of using an extended file entry, the AV reservation region may be kept as a part of an extent of a named data stream of the file AVFILES.IFO. Furthermore, in this case, the extent forming the AV reservation region may be set to be an "allocated" and "recorded" extent.

In Embodiment 2, the AV reservation region management file is recorded in the same directory as that for recording an AV file. However, the AV reservation region management file may be recorded in another directory. By recording the AV reservation region management file in another directory, it becomes possible to prevent the management file from being deleted mistakenly by a user's operation or the like.

Embodiment 3

Figure 8:
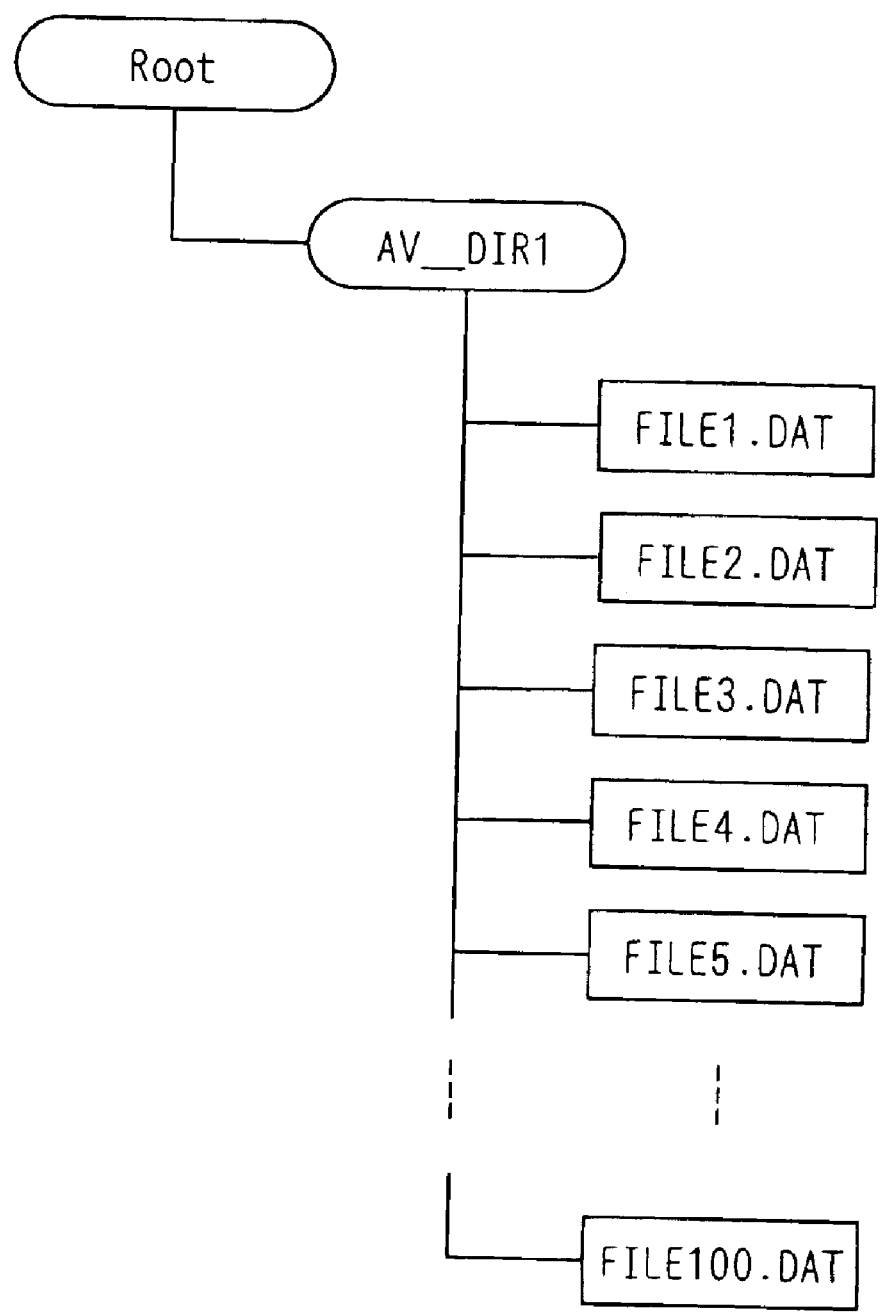
FIG. 8 illustrates an initial directory structure in the AV data recording apparatus in Embodiment 3 of the present invention.

Hereinafter, an AV data recording apparatus in Embodiment 3 of the present invention will be described with reference to the drawings. In Embodiment 3, the case will be described where 100 AV files are recorded in the directory AV_DIR1. FIG. 8 illustrates a file/directory structure in Embodiment 3.

In Embodiments 1 and 2, a "not recorded" but "allocated" extent is allocated to a directory or a file, and a file entry or the like of an AV file is recorded in the extent. Embodiment 3 is different from Embodiments 1 and 2, in that when a directory for recording an AV file is created, a file identifier descriptor and a file entry for an AV file also are created in a continuous region.

FIG. 9 illustrates a data structure in a partition space in Embodiment 3. In FIG. 9, each file is assigned a file name automatically, and these file names are recorded in the file identifier descriptor. In Embodiment 3, 100 files are present under the directory AV_DIR1, so that 100 file identifier descriptors are recorded in the extent of the directory AV_DIR1. An allocation descriptor in each file entry of the AV files recorded in LBN=101 to 200 does not refer to an extent, and the data capacity as a file is 0.

In Embodiment 3, a file identifier descriptor and a file entry already have been recorded. Therefore, when an AV file is recorded, data are read to the memory section 4 in the same way as in the processing procedure shown in FIG. 4. However, at Step S402, a non-recorded region is not scanned; instead, information on file entries recorded in LBN=101 to 200 is scanned, a file entry with a file capacity of 0 is detected, and data are recorded using the detected file entry as a new AV file.

When recording of data is completed, information on the position and length of the extent recorded in the allocation descriptor of the file entry in the memory section 4 and other file management information are updated. Finally, the content of the memory section 4 is written back to the disk 1 in the same way as in Step S408. Similarly, when an AV file is reproduced, the procedure similar to that described in Embodiment 1 can be performed.

In Embodiment 3, a file entry with a file capacity of 0 is detected, and data are recorded using the detected file entry as a new AV file. However, a method for detecting a new file entry is not limited to this method. Another method may be used. For example, a file name in an initial state may be changed after recording of actual AV data. Alternatively, it may be possible to determined whether or not AV data can be recorded, using a file attribute field in a file identifier descriptor, an extended attribute field in the file entry, and the like.

Furthermore, the data capacity of a file in an initial state is set to be 0. However, by recording common attribute information between AV files and the like, data may be recorded even in an initial state.

Embodiment 4

Hereinafter, an AV data recording apparatus in Embodiment 4 of the present invention will be described with reference to the drawings. As described above, in Embodiments 1 to 3, file management information such as a file entry is recorded in a region that already has been kept. In Embodiment 4, attribute information of an AV file, as well as a file entry are recorded in a region that has already been kept. Because of this, particular information on an AV file can be accessed continuously at a high speed.

Figure 10:
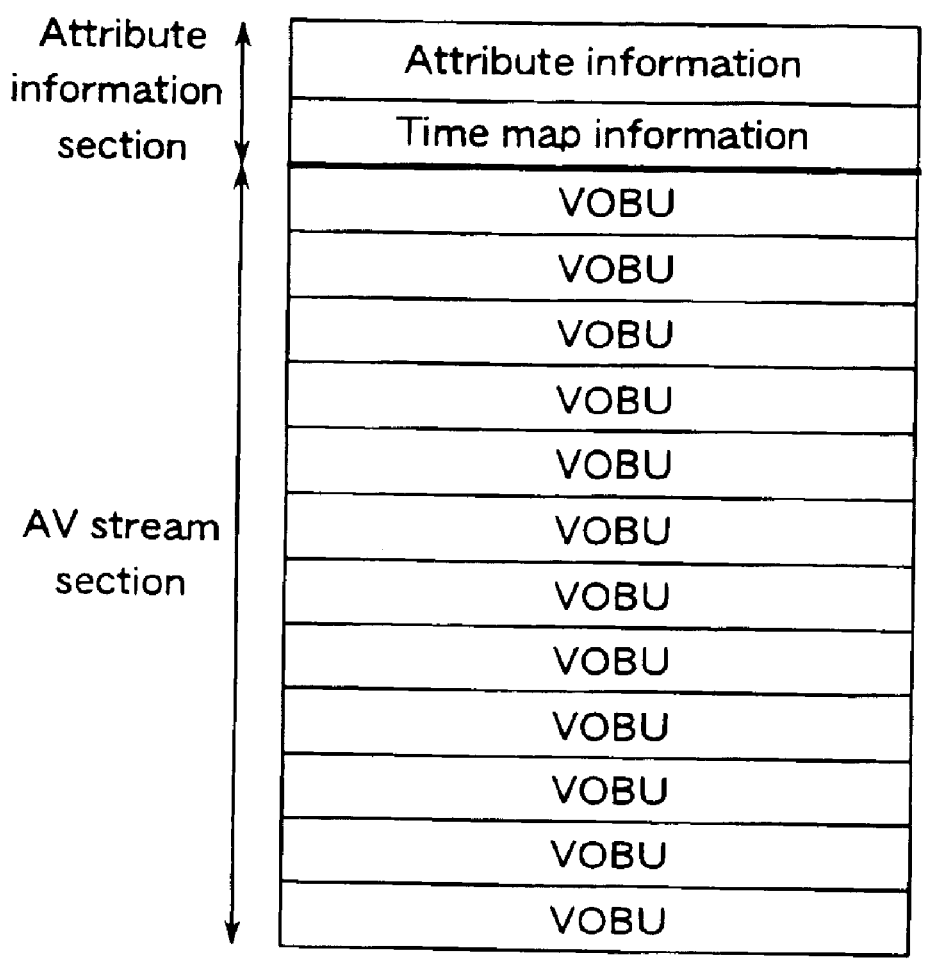
FIG. 10 illustrates an AV file structure in the AV data recording apparatus in Embodiment 4 of the present invention.

FIG. 10 illustrates a data structure of an AV file to be recorded in Embodiment 4. In FIG. 10, an AV file in Embodiment 4 is a transport stream based on the MPEG system, and is composed of an AV stream part that is a video stream and an attribute information part that is a private stream. The AV stream part is composed of a plurality of video object units (hereinafter, referred to as "VOBU").

One VOBU is AV data corresponding to 0.4 to 1 second of video data, and includes a video data interval called a GOP (Group of Picture) under the MPEG2 standard. The GOP includes at least one I-picture, so that the GOP can be reproduced independently. In the case of special reproduction such as fast-forward reproduction and fast-backward reproduction and reproduction at a specified time, an I-picture in the GOP is extracted as an image to be reproduced.

In the attribute information part, attribute information on an AV stream is recorded. For example, a recorded date and time of a file, a comment with respect to recorded information, parameters during recording, a thumbnail image, and the like are recorded. Furthermore, in the attribute information part, in addition to the above-mentioned attribute information, time map information is recorded for the purpose of facilitating special reproduction such as fast-forward reproduction and reproduction at a specified time with respect to an AV stream.

Figure 11:
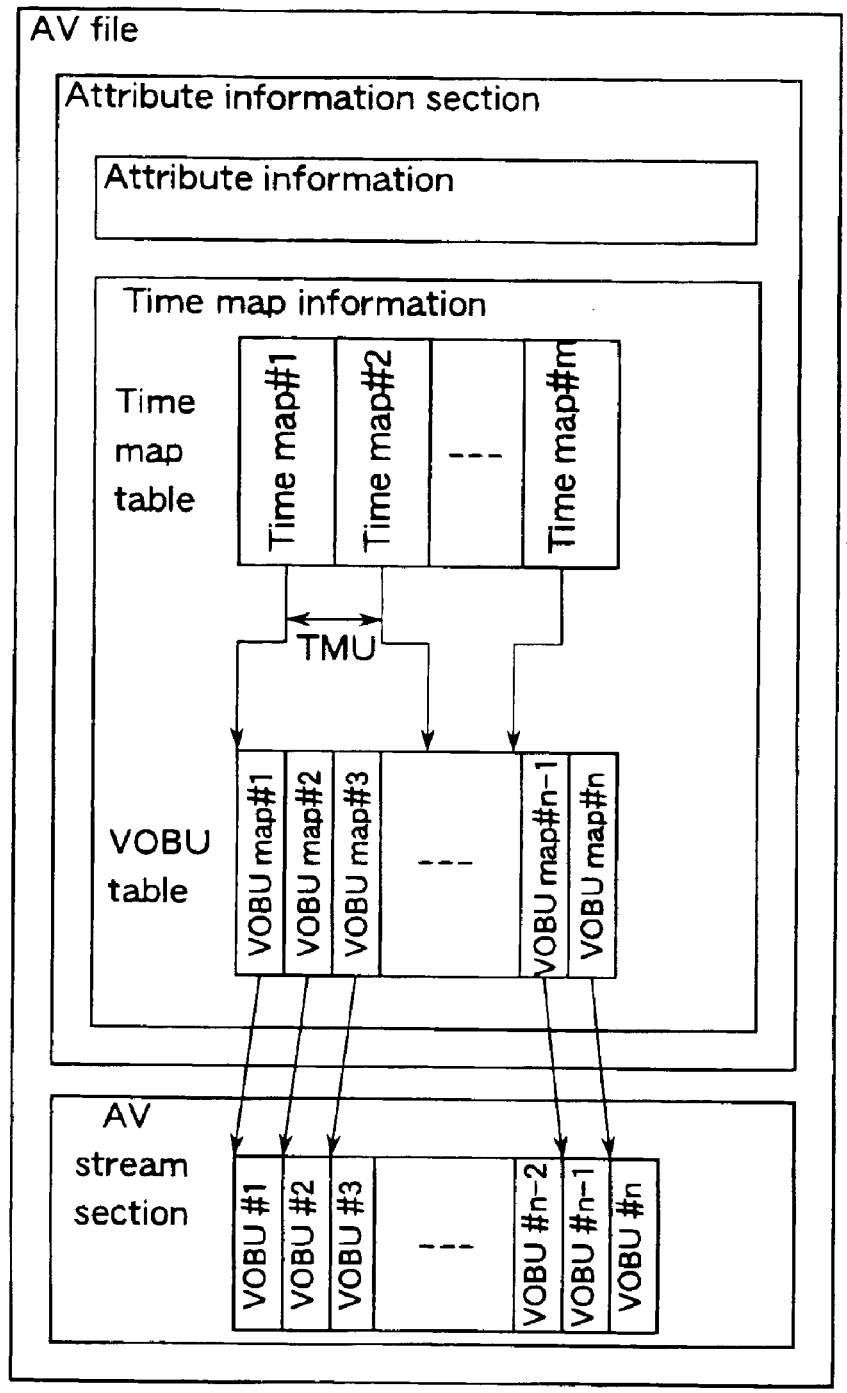
FIG. 11 illustrates a time map in the AV data recording apparatus in Embodiment 4 of the present invention.

The time map information is the one in which a reproduction time of an AV stream is related to a recorded position, for example, as described in JP 3028517. As shown in FIG. 11, the time map information has a hierarchical data structure composed of two tables called a time map table and a VOBU table.

In the time map table, time maps #1, #2, . . . are arranged. Time maps #1, #2, . . . represent recorded positions of VOBU corresponding to reproduction times in the case where data is reproduced at a predetermined time interval TMU (e.g., 60 seconds) on a time axis with a leading edge of the AV stream part at a starting time.

In the VOBU table, VOBU maps, each containing a reproduction time and a data size of each VOBU, are arranged in the order of reproduction time from the leading edge of the AV stream part.

Figure 12:
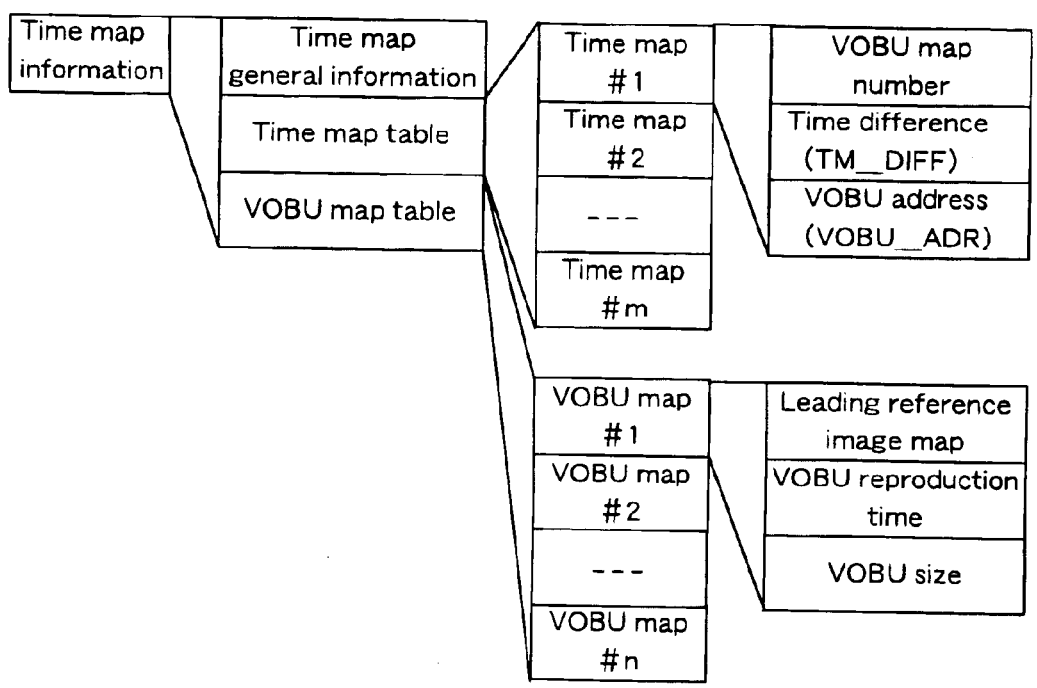
FIG. 12 illustrates a time map in the AV data recording apparatus in Embodiment 4 of the present invention.
Figure 13:
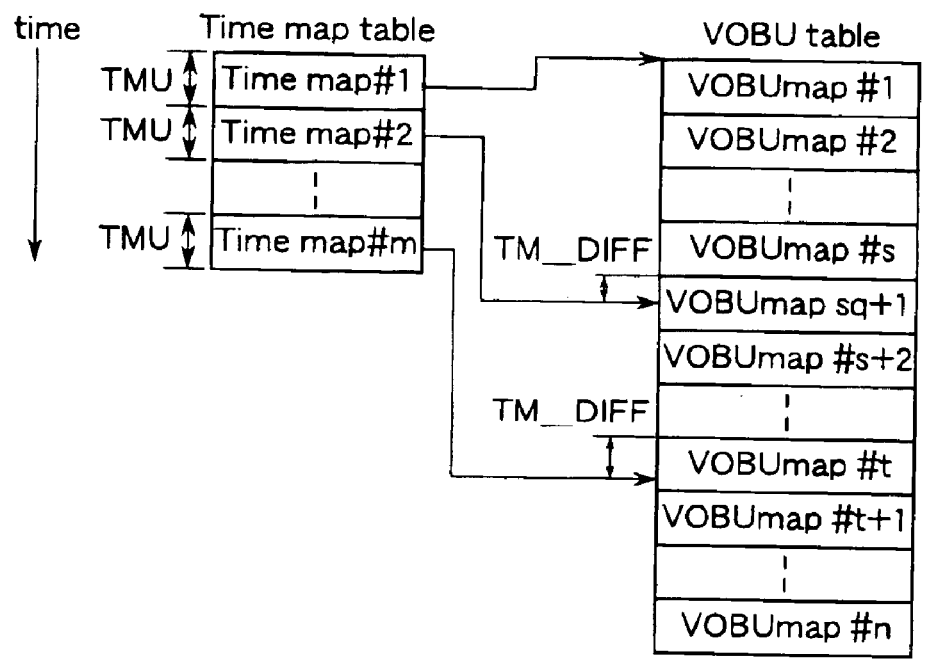
FIG. 13 illustrates a time map in the AV data recording apparatus in Embodiment 4 of the present invention.

FIG. 12 shows the data structure of time map information in more detail. FIG. 13 shows the logical link relationship between the time map table and the VOBU table.

Herein, time map general information includes the number of time maps and VOBU maps included in the time map information, a time unit (hereinafter, referred to as "TMU") representing a predetermined time interval in which time maps are provided, and a time offset (hereinafter, referred to as "TM_OFS") representing a time difference between the leading time of the AV stream part and the time of the leading time map. The value of TM_OFS is "0", as long as an edit operation such as deletion of the leading edge of the AV stream part is performed.

In the time map table, a plurality of time maps #1, #2, . . . are provided at a predetermined time interval represented by the TMU and arranged in the order of time.

Each time map is composed of a VOBU map number, a time difference (hereinafter, referred to as "TM_DIFF"), and a VOBU address (hereinafter, referred to as "VOBU_DR"). VOBU_ADR is positional information in the AV stream part at the leading edge of the corresponding VOBU.

A reproduction time (hereinafter, referred to as a "time map time") with respect to time map #i is represented by Formula (1).

$$(\text{Time map time}) = (TMU*(i-1) + TM\_OFS) \quad (1)$$

The VOBU map number represents the number present at a reproduction time represented by Formula (1). For example, as shown in FIG. 13, the time map #1 represents a time obtained by adding TM_OFS to a leading time in the AV stream part. The time map #2 represents a time after TMU from the time map #1. Thereafter, the time maps represent VOBU maps present at reproduction times at 2 TMU, 3TMU, . . . , respectively.

TM_DIFF represents a time difference between the leading time of the corresponding VOBU and the time map time. Thus, the leading time of VOBU #j is represented by Formula (2).

$$(\text{Leading time of VOBU}) = TMU*(j-1) + TM\_OFS\_TM\_TIFF \quad (2)$$

In the VOBU table, VOBU maps #1, #2, . . . corresponding to VOBUs contained in the AV stream part in one-to-one relationship. Each VOBU map consists of a reference image size, a VOBU reproduction time, and a VOBU size.

The reference image size refers to the size of the first I-picture in the VOBU, and is used for finding an image of interest for special reproduction or reproduction at a specified time. For example, by adding successively a VOBU reproduction time to the VOBU leading time until the reproduction time of an image of interest is obtained, a VOBU to be reproduced is specified and an image in the VOBU is specified.

A VOBU size is a data size of a VOBU, and is used for specifying the position of image data of interest for special reproduction or reproduction at a specified time.

As described above, in Embodiment 4, even in the case of special reproduction, a particular image such as an I-picture can be searched for at a high speed.

A file/directory structure in an initial state in Embodiment 4 is the same as that shown in FIG. 2. FIG. 14 shows a data structure in a partition space in this case. The data structure in FIG. 14 is different from that in FIG. 3, in that a region for recording a part of an AV file in addition to file management information also is kept as a "not recorded" but "allocated" extent of the directory AV_DIR1. Therefore, the extent (2) of the directory AV_DIR1 is recorded in logical blocks LBN=86 to 500. In the case of the same number of AV files, the data structure shown in FIG. 14 can keep more AV files, compared with that shown in FIG. 3. In this case, the capacity to be kept equals the total of the capacity of file management information and the capacity of attribute information part with respect to the assumed number of AV files.

Regarding an AV file, an item (i.e., time map information) that is varied depending upon the data capacity in the AV stream part is included in the attribute information part. However, by setting conditions such as a disk capacity, the number of AV files to be recorded, and a bit rate of an AV stream, the maximum capacity in the time map information part to be recorded on the disk 1 can be determined previously. Thus, the capacity of an AV reservation region should be kept with respect to an AV file to be recorded in the directory AV_DIR1, expecting the total capacity in the attribute information part in the case where the capacity of the time map information part becomes maximized.

Figure 15:
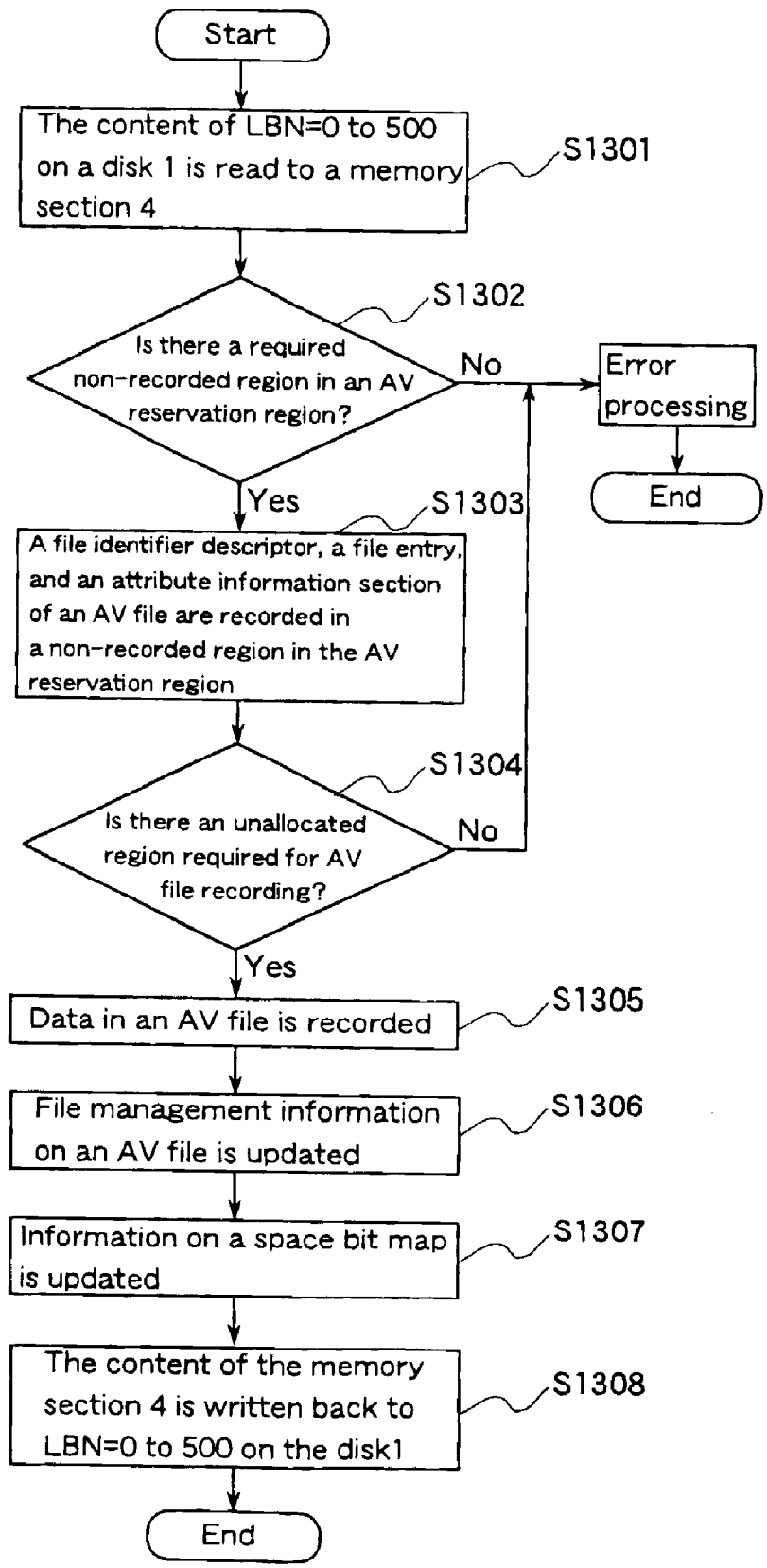
FIG. 15 is a flow chart showing recording processing of an AV file in the AV data recording apparatus in Embodiment 4 of the present invention.

An AV file is recorded onto a disk having the above-mentioned data structure in accordance with a flow chart shown in FIG. 15.

In FIG. 15, first, the content of LBN=0 to 500 on the disk 1 is read to the memory section 4 (Step S1301). Then, extent information in the directory AV_DIR1 in the memory section 4 is scanned to determine whether or not there is a non-recorded region sufficient for recording a file identifier descriptor, a file entry, and an attribute information part of a file (Step S1302). When it is determined that there is not a sufficient non-recorded region (Step S1302: No), error processing is performed and recording of an AV file is ended. When it is determined that there is a sufficient non-recorded region, a file identifier descriptor, a file entry, and an attribute information part of an AV file are recorded in the non-recorded region in the extent of the directory AV_DIR1 in the memory section 4 (Step S1303).

Then, in accordance with recording of the file identifier descriptor, the file entry, and the attribute information part of an AV file, an allocation descriptor of the file entry of the directory AV_DIR1 is rewritten. More specifically, the extent length of the recorded extent is changed by addition of the file identifier descriptor, and a portion in which the file entry has been recorded is excluded from the non-recorded extent. Furthermore, information that is determined to be recorded in the attribute information part of an AV file also is recorded in the AV reservation region in the memory section 4.

Next, the space bitmap in the memory section 4 is scanned to determine whether or not there are the required number of unallocated logical blocks for recording an AV file (Step S1304). When it is determined that there are no the required number of unallocated logical blocks (Step S1304: No), error processing is performed, and recording of an AV file is ended. When it is determined that there are the required number of unallocated logical blocks, data is recorded in a logical block on a recording medium corresponding to the non-recorded region obtained in Step S1303 (Step S1305).

Furthermore, time map information is obtained at this time among attribute information of an AV file, so that it is recorded appropriately in the AV reservation region in the memory section 4. When recording of the AV fle data is completed, information on the position and length of an extent of the AV file are recorded in an allocation descriptor in the file entry created in Step S1303 (Step S1306). Furthermore, required information such as a file name and a file creation time are updated with respect to the file identifier descriptor and the file entry, in addition to the allocation descriptor.

Next, with respect to the space bit map in the memory section 4, a bit corresponding to the logical block in which data has been recorded in Step S1305 is changed to "1" representing an "allocated" state (Step S1307). Then, the content of the memory section 4 is written back to LBN=0 to 500 (Step S1308). Thus, anAV file is recorded in the directory AV_DIR1.

In the case of recording a plurality of AV files continuously, in the flow chart in FIG. 16, Steps S1302 to S1307 are repeated after Step S1301 until recording of all the AV files is completed, and after recording of all the AV files is completed, a process should proceed to Step S1308. Because of this, it is not required to write a file identifier descriptor and a file entry onto a disk every time a file is created, and seeking can be reduced substantially.

FIG. 16 shows a data structure in the partition space after FILE1. DAT and FILE2. DAT that are AV files are recorded in the directory AV_DIR1 in accordance with the flow chart shown in FIG. 15. Herein, in the AV reservation region, a file identifier descriptor, a file entry, and an attribute information part of an AV file are recorded.

An AV file is reproduced from a disk having the data structure as shown in FIG. 16 by the procedure similar to that described in Embodiment 1. In Step S408, the content of LBN=0 to 500 on the disk 1 is read to the memory section 4.

Furthermore, in the case of reproducing a particular display time of an AV file, file identifier descriptors, file entries, and attribute information parts including time map information of all the AV files present under the directory AV_DIR1 are read to the memory section 4. Thus, an offset position in a file with respect to a certain reproduction time is obtained by processing only information in the memory section 4, and seeking is not required with respect to the disk 1. As a result, special reproduction (selective reproduction of particular frames) can be performed easily. Furthermore, it becomes possible that various pieces of attribute information are extracted, and a list thereof is displayed to a user.

Such continuous reproduction is realized easily by performing recording in accordance with the processing procedure shown in FIG. 15. If the recording procedure in Embodiment 4 is not used, attribute information of an AV file is recorded in the same extent as that in the AV stream part, and distributed on the disk. As a result, seeking to extract attribute information cannot be avoided.

The positional relationship in the AV reservation region of a file entry, attribute information, and time map information may be varied. In the course of reproduction of an AV file, a portion of the AV reservation region, in which attribute information of an AV file is recorded, is read entirely to the memory section 4. However, instead of reading the entire portion from the beginning, the attribute information may be read when required. In this case, compared with the prior art, seeking can be reduced, and a table for attribute information of an AV file and a high-speed access can be read at a high speed.

Furthermore, in Embodiment 4, the AV reservation region is provided as an extent of the directory AV_DIR1. However, it may be possible to create a management file, and provide an AV reservation region as the extent of the management file as in Embodiment 2. In this case, recording/reproduction of an AV file is performed in the same way as in Embodiment 2.

The AV reservation region may be kept as a plurality of extents. For example, it may be possible to provide an AV reservation region for a file management region as an extent of the directory AV_DIR1, and to provide an AV reservation region for attribute information of an AV file as an extent of the management file.

Alternatively, the following may be possible: two kinds of management files are provided, an AV reservation region for a file management region is provided in the first management file, and an AV reservation region for attribute information of an AV file is provided in the second management file. Furthermore, other methods may be used, as long as an AV reservation region is kept as a continuous region.

Time map information should be the one in which a reproduction time of an AV stream is related to a recorded position, and may have a structure other than that shown in FIG. 11.

In Embodiment 4, an AV file is a transport stream based on the MPEG. However, the AV file may be in another format. Particular information of an AV file simply may be recorded in a region that has been kept previously.

Embodiment 5

Hereinafter, an AV data recording apparatus in Embodiment 5 of the present invention will be described with reference to the drawings. As described above, in Embodiment 4, an AV file is recorded, which is composed of an AV stream part in which video data of MPEG2 is recorded and an attribute information part. In Embodiment 5, an AV file is an Exif image file, which is composed of an Exif main image (main image data), and additional information related to the Exif main image.

More specifically, an AV file in Embodiment 5 is composed of a header part formed of additional information related to a still image and a video data part formed of a still image data body. The additional information is recorded in an AV reservation region. Because of this, particular information such as a thumbnail image of an AV file can be accessed continuously at a high speed, by seeking only in the AV reservation region.

Figure 17:
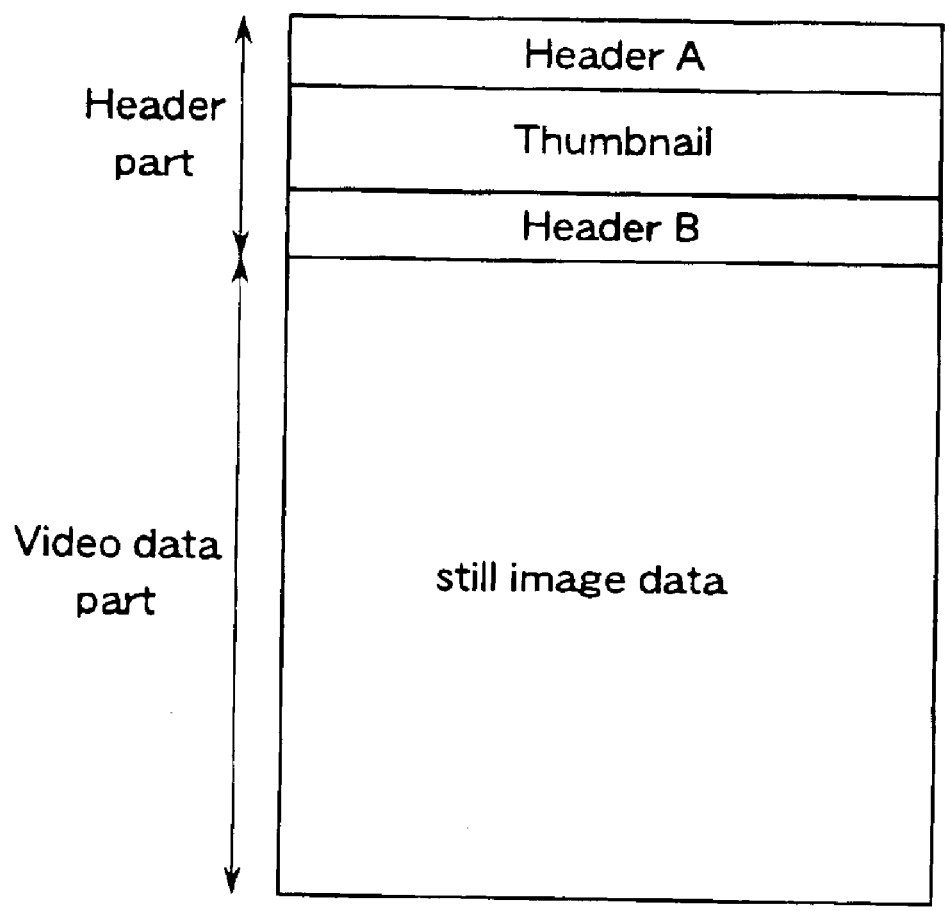
FIG. 17 illustrates a date structure of a still image file in an AV data recording apparatus in Embodiment 5 of the present invention.

FIG. 17 illustrates a data structure of an AV file in the AV data recording apparatus in Embodiment 5 of the present invention. In FIG. 17, an AV file in Embodiment 5 is composed of a header part and a video data part.

In the header part, additional information on the image data part is recorded. For example, a recorded date and time of a file, a comment on recorded information, parameters at a time of recording/compression, a thumbnail image, and the like are recorded. Furthermore, in the video data part, a still image data body compressed based on the JPEG system is recorded.

A file/directory structure in the AV data recording apparatus in Embodiment 5 is the same as that shown in FIG. 2. A data structure in a partition space thereof is the same as that shown in FIG. 14.

In the AV reservation region, file management information of an AV file, and data with a predetermined capacity from the leading edge of the AV file are recorded. It is assumed that data with such a predetermined capacity include at least a thumbnail image in the header part of an AV file.

Thus, when a thumbnail list of recorded AV files and a list of recorded date and time are displayed to a user, information thereof is recorded in the AV reservation region that is a continuous region, so that they can be displayed at a high speed.

Figure 18:
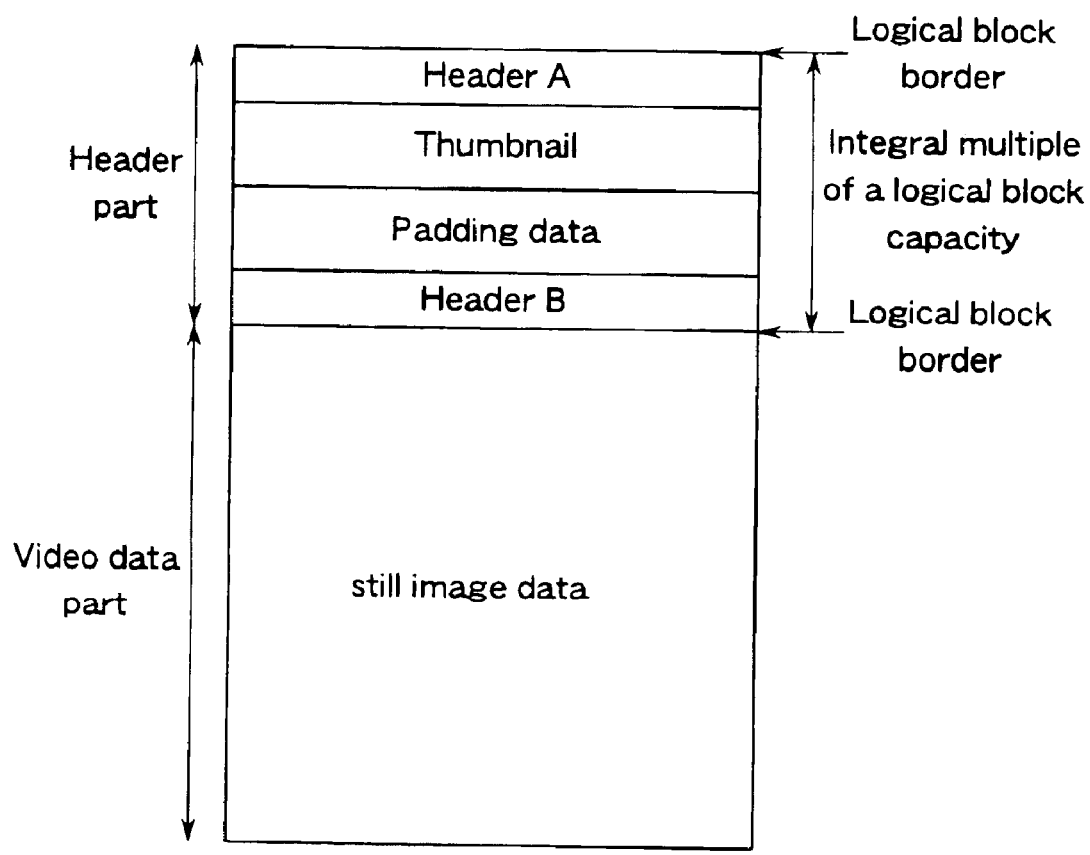
FIG. 18 illustrates a date structure of a still image file in the AV data recording apparatus in Embodiment 5 of the present invention.

A data structure of an AV file may be constructed as shown in FIG. 18: padding data are inserted into the header part so that the capacity of the entire header part is adjusted to be an integral multiple of the logical block capacity of the UDF. At this time, since the capacity of the header part is an integral multiple of the logical block capacity of the UDF, the video data part always is positioned from the leading edge of the logical block. Furthermore, only the file management information and the header part are recorded in the AV reservation region. Thus, in the course of recording/reproduction of an AV file, the header part can be separated completely from the video data part, and data can be processed on a logical block basis; therefore, recording/reproduction can be performed at a higher speed.

In Embodiment 5, as an AV file, an Exif file containing a main image compressed based on the JPEG system is used. However, the present invention is not limited thereto. Any still image file with a format having additional information in the header part may be used.

A plurality of AV directories may be present on the disk. In this case, a still image file is recorded in one directory as in Embodiment 5, and a video file of MPEG2 may be recorded in the other directory as in Embodiment 4. Furthermore, the number of AV directories is not limited to two. If required, the number of directories may be increased.

Figure 19:
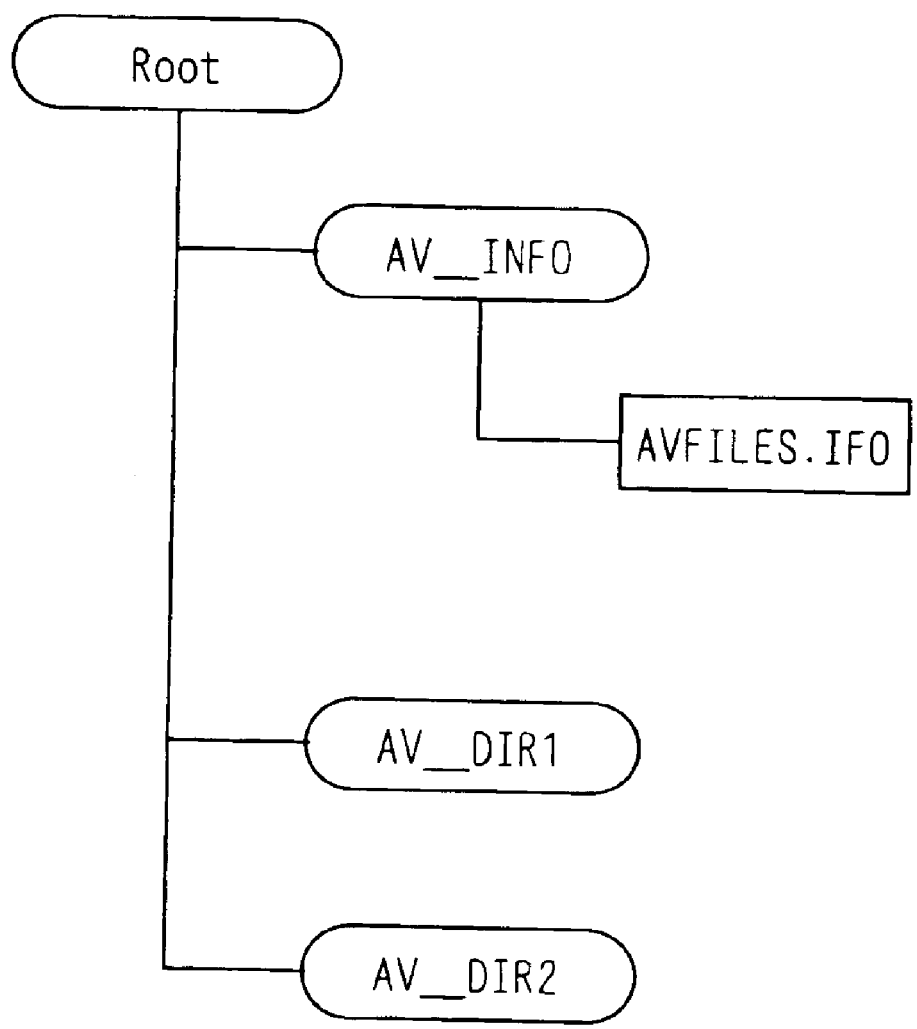
FIG. 19 illustrates a multi-directory structure in the AV data recording apparatus in Embodiment 5 of the present invention.

In this case, the AV reservation region may be managed on a directory basis. Alternatively, it may be possible to provide a dedicated management directory and manage an AV reservation region used in each directory. For example, as shown in FIG. 19, the following is conceivable: an AV reservation region management file AVFILES.IFO is placed under a management directory AV_INFO, a still image file is recorded in the AV directory AV_DIR1 using an AV reservation region managed by the AV reservation region management file, and a video file is recorded in the directory AV_DIR2.

A video file and a still image file are not required to be recorded in separate directories. A video file and a still image file may be mixed in one directory.

As described above, in Embodiment 5, data recorded by a user can be separated from information for managing the data, which prevents damage and the like to management information due to maloperation and the like. In Embodiment 5, a single AV reservation management region file is used. However, for example, an AV reservation management region file may be provided on an AV directory basis.

Embodiment 6

Hereinafter, an AV data recording apparatus in Embodiment 6 of the present invention will be described with reference to the drawings. In Embodiment 6, the case will be described where an AV directory has a hierarchical structure. It is convenient to support a hierarchical directory for classifying recorded data, and the like. However, in the case of the UDF, a directory also is handled as a kind of a file, so that seeking cannot be avoided particularly in the case of a directory structure with a deep hierarchy.

Figure 20:
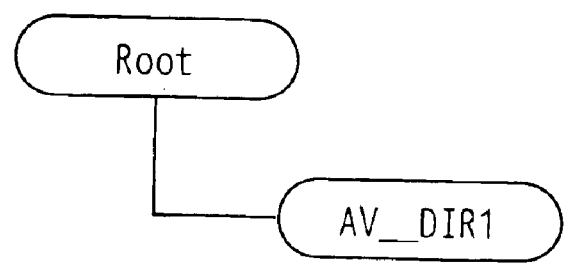
FIG. 20 illustrates an initial directory structure in the AV data recording apparatus in Embodiment 6 of the present invention.

In Embodiment 6, a reservation region is provided for creating a hierarchical directory. FIG. 20 illustrates a file/directory structure immediately after a directory for recording an AV file is created.

FIG. 21 shows a data structure in a partition space when the file/directory structure shown in FIG. 20 is recorded on a disk used in the AV data recording apparatus in Embodiment 6 of the present invention.

LBN=86 to 250 is an extent (2) of the AV_DIR1 directory, and the value of the 2 most significant bits of an allocation descriptor is set so that the extent (2) is "not recorded" but "allocated". Hereinafter, the extent (2) will be referred to as an AV directory reservation region.

Figure 22:
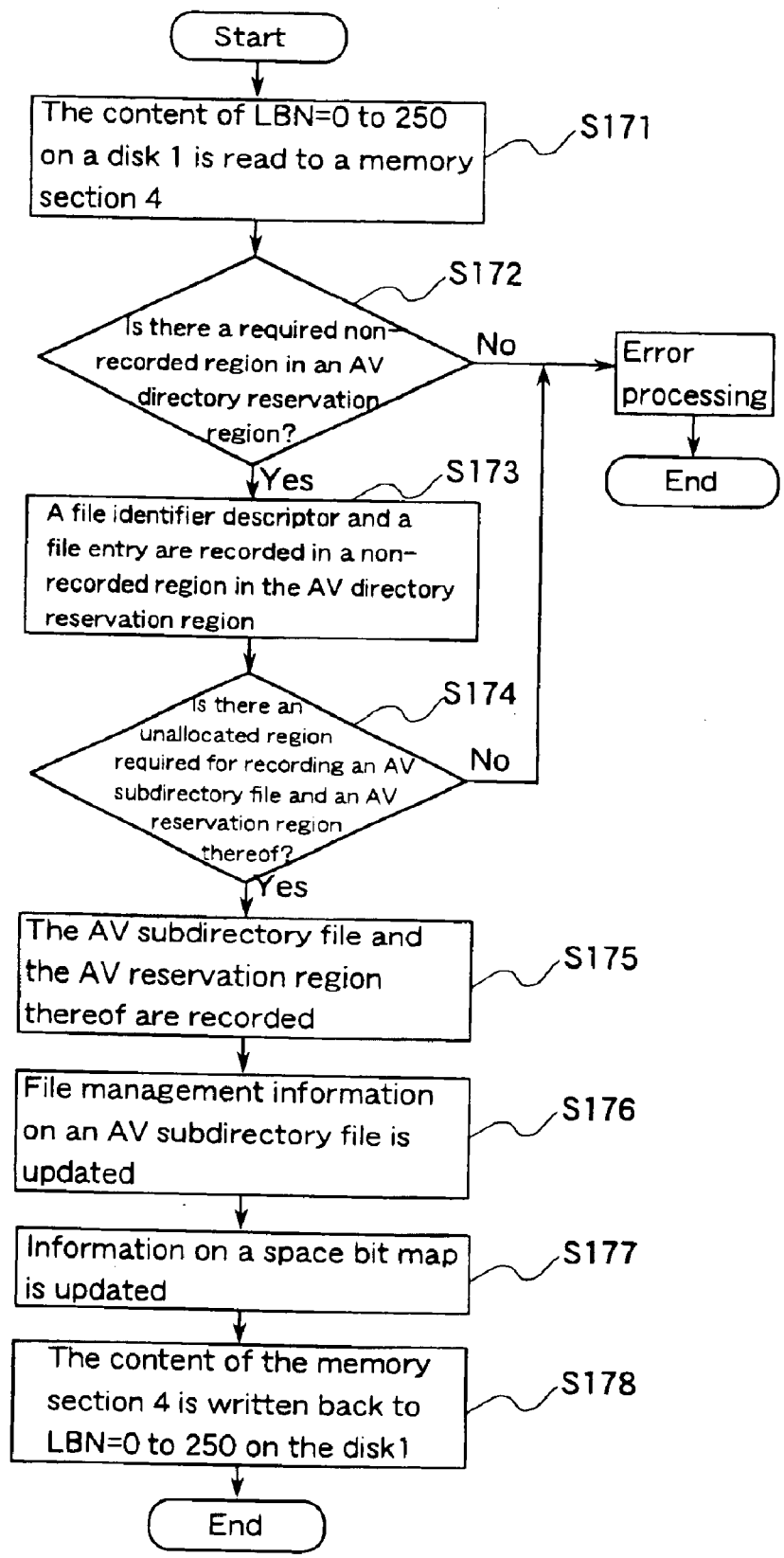
FIG. 22 is a flow chart showing recording processing of an AV file in the AV data recording apparatus in Embodiment 6 of the present invention.

A subdirectory is created under the AV directory on the disk having the above-mentioned structure in accordance with a flow chart shown in FIG. 22.

First, the content of LBN=0 to 250 on the disk 1 is read to the memory section 4 (Step S171). Then, information in the AV directory reservation region in the memory section 4 is scanned to determine whether or not there is a non-recorded region sufficient for newly recording a file identifier descriptor and a file entry for the AV subdirectory (Step S172). When it is determined that there is not a sufficient non-recorded region (Step S172: No), error processing is performed, and creation of an AV subdirectory is ended.

When it is determined that there is a sufficient non-recorded region, a file identifier descriptor and a file entry are recorded in the non-recorded region in the AV reservation region in the memory section 4 (Step S173). At this time, the size of the extent of the AV_DIR1 directory is changed due to recording of the file identifier descriptor and the file entry; therefore, an allocation descriptor of the file entry of the AV_DIR1 directory is rewritten in accordance with the change.

More specifically, the extent length of the extent (1) is changed by addition of the file identifier descriptor, and a portion in which the file entry has been recorded is excluded from the extent (2).

Next, the space bitmap in the memory section 4 is scanned to determine whether or not there are the required number of continuous unallocated logical blocks for recording an AV subdirectory and an AV reservation region to be allocated thereto (Step S174). When it is determined that there are not the required number of continuous unallocated logical blocks (Step S174: No), processing is ended.

When it is determined that there are the required number of continuous unallocated logical blocks, data are recorded in a logical block on the disk corresponding to an unallocated region obtained in Step S173 (Step S175). Herein, recording of data includes creation of a directory file of an AV subdirectory, and keeping of an AV reservation region allocated to the AV subdirectory.

When recording of data is completed, in order to update file management information of the AV subdirectory file, information on the position and length of the extent of the AV subdirectory file is recorded in an allocation descriptor of the file entry in the memory section 4 created in Step S173 (Step S176).

Furthermore, required information such as a file name and a file creation time also are updated with respect to the file identifier descriptor and the file entry, in addition to the allocation descriptor.

Next, with respect to the space bitmap in the memory section 4, bits corresponding to logical blocks in which data is recorded in Step S173 are changed to "1" representing an "allocated" state (Step S177).

Figure 23:
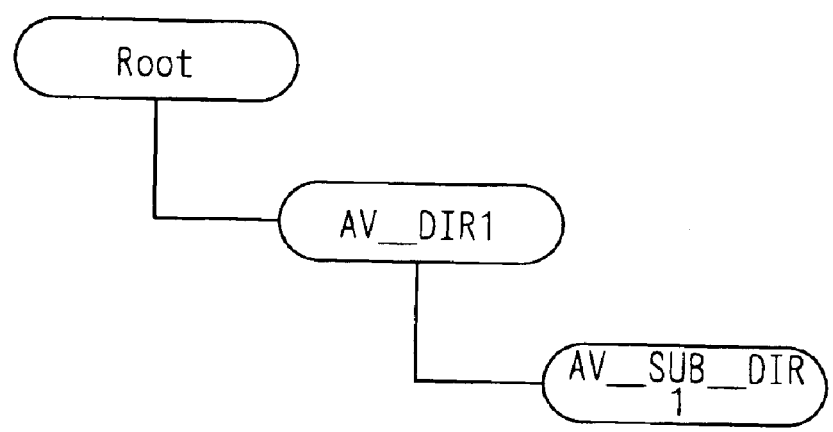
FIG. 23 illustrates a directory structure after a subdirectory is created in the AV data recording apparatus in Embodiment 6 of the present invention.

Then, the content of the memory section 4 is written back to LBN=0 to 250 (Step S178). Thus, an AV subdirectory AV_SUB_DIR1 is created under the directory AV_DIR1 by a series of processing. FIG. 23 shows a directory structure in this case. FIG. 24 shows a data structure in the partition space in this case.

Herein, in the same way as in Embodiment 1, new file entries are recorded in logical blocks in the decreasing order of LBN in the AV directory reservation region. On the other hand, the file identifier descriptor is added to the end of the extent (1) that is a recorded extent of the directory AV_DIR1. Herein, an AV file is not recorded, and a directory file is recorded.

The created AV subdirectory is an extent (2), and the value of the 2 most significant bits of an allocation descriptor is set so that the extent (2) is "not recorded" but "allocated". When an AV file is recorded in the directory AV_SUB_DIR1 hereinafter, it is recorded in the same procedure as that in Embodiment 1, using the AV reservation region.

Figure 25:
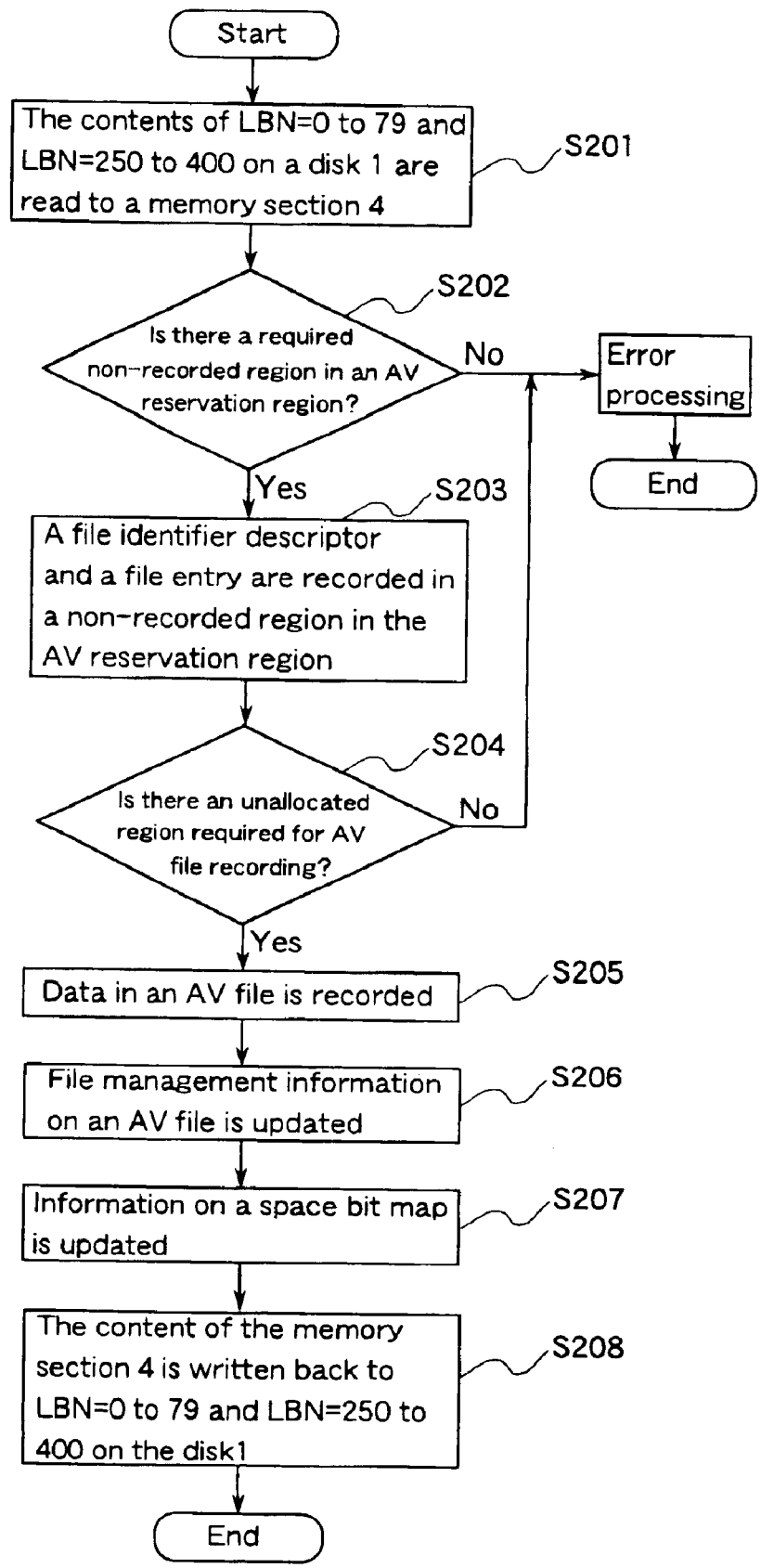
FIG. 25 is a flow chart showing recording processing of an AV file in the AV data recording apparatus in Embodiment 6 of the present invention.

Furthermore, an AV file is recorded on the disk having the above-mentioned data structure in accordance with a flow chart in FIG. 25.

First, the contents of LBN=0 to 79 and LBN=250 to 400 on the disk 1 are read to the memory section 4 (Step S201). Then, information in the AV reservation region in the subdirectory AV_SUB_DIR1 in the memory section 4 is scanned to determine whether or not there is a non-recorded region sufficient for newly recording a file identifier descriptor and a file entry (Step S202). When it is determined that there is not a sufficient non-recorded region (Step S202: No), error processing is performed, and recording of an AV file is ended.

When it is determined that there is a sufficient non-recorded region, a file identifier descriptor and a file entry are recorded in a non-recorded region in the AV reservation region in the subdirectory AV_SUB_DIR1 in the memory section 4 (Step S203).

Then, the space bitmap in the memory section 4 is scanned to determine whether or not there are the required number of unallocated logical blocks for recording AV files (Step S204). When it is determined that there are not the required number of unallocated logical blocks (Step S204: No), error processing is performed, and recording is completed.

When it is determined that there are the required number of unallocated logical blocks, data is recorded in a logical block on a recording medium corresponding to the non-recorded region obtained in Step S203 (Step S205).

When recording of AV file data is completed, in order to update the file management information of the AV file, information on the position and length of the extent of the AV file is recorded in an allocation descriptor of the file entry in the memory section 4 created in Step S205 (Step S206).

Next, with respect to the space bitmap in the memory section 4, bits corresponding to logical blocks in which data are recorded in Step S205 are changed to "1" representing an "allocated" state (Step S207).

Then, the content of the memory section 4 is written back to LBN=0 to 79 and LBN=250 to 400 on the disk 1 (Step S208). Thus, an AV file can be recorded in the directory AV_SUB_DIR1.

FIG. 26 shows a data structure in a partition space after FILE 1.DAT and FILE2.DAT that are AV files are recorded in the directory AV SUB_DIR1 by processing shown in FIG. 25.

In FIG. 26, in the AV reservation region allocated to the directory AV_SUB_DIR1, logical blocks are used in the decreasing order of LBN for recording new file entries. On the other hand, a file identifier descriptor is added to the end of the extent (1) that is a recorded extent of the directory AV_SUB_DIR1. In the case where a predetermined number of AV files are recorded in the directory AV_SUB_DIR1, another subdirectory is created under the directory AV_DIR1, and an AV file is recorded in this directory.

An AV file is reproduced from a disk having the data structure shown in FIG. 26 by the following procedure. First, a root directory is read, and the directory AV_DIR1 and the directory AV_SUB_DIR1 are read. At this time, a portion corresponding to the AV reservation region allocated to the directory AV_SUB_DIR1 (i.e., LBN=251 to 400) is read to the memory section 4.

Then, the recorded extent of the directory AV_SUB_DIR1 is scanned to obtain a name of a file in the directory AV_SUB_DIR1.

Next, data in the file is accessed and reproduced in the procedure described in the prior art.

In the case where a file in another AV subdirectory is read, an AV reservation region allocated to the AV subdirectory is read, and thereafter, a file is accessed.

As described above, in Embodiment 6, even in the case where a directory has a hierarchical structure, seeking at a time of creating a file and reading a file can be reduced substantially.

A new AV subdirectory should be created, for example, in the case of a user's instruction, or in the case where a predetermined number of files are recorded in the AV subdirectory.

Embodiment 7

Hereinafter, an AV data recording apparatus in Embodiment 7 of the present invention will be described with reference to the drawings. In Embodiment 7, the case will be described where an AV reservation region also is allocated to an AV subdirectory when the AV directory has a hierarchical structure.

Figure 27:
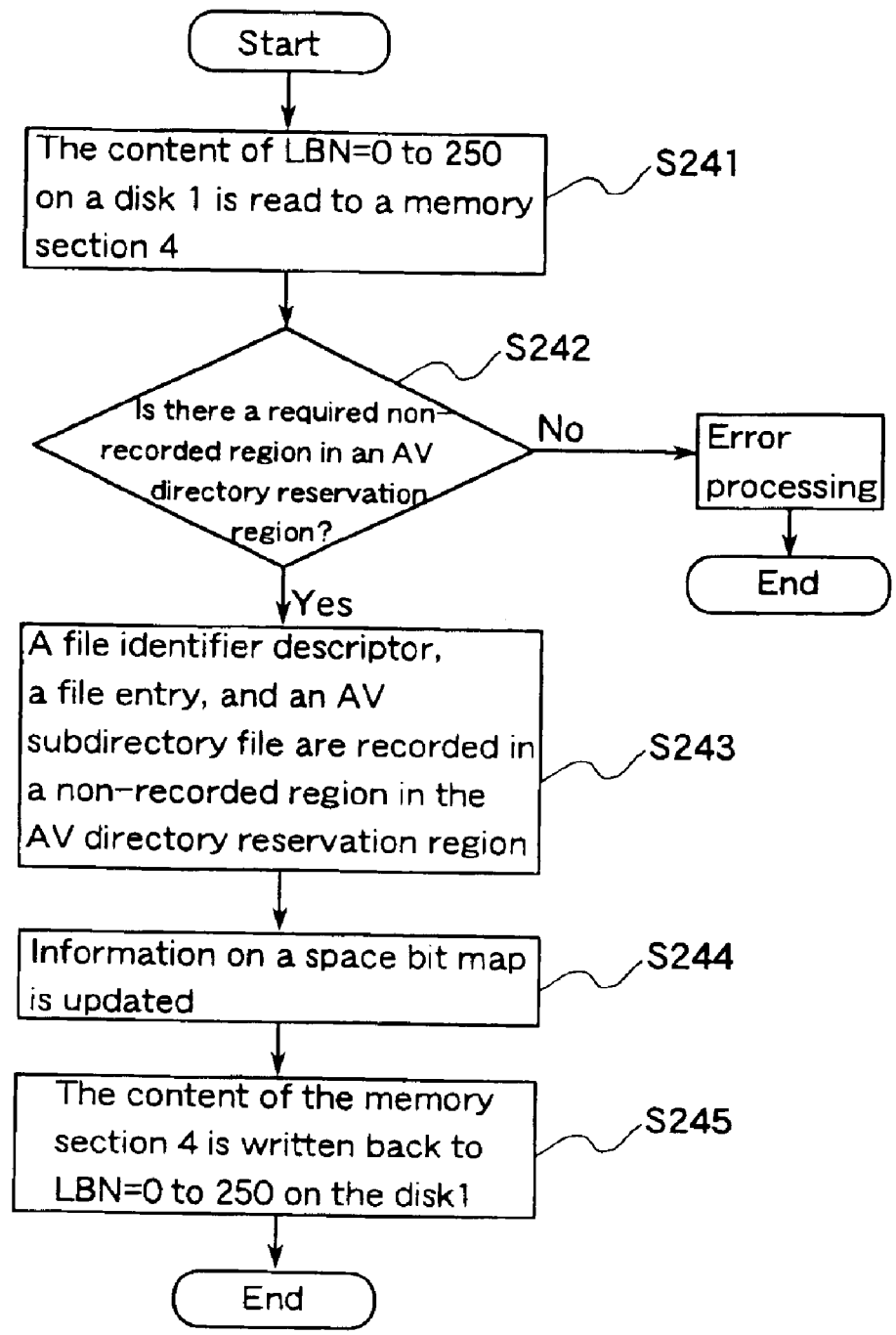
FIG. 27 is a flow chart showing processing of creating a subdirectory in an AV data recording apparatus in Embodiment 7 of the present invention.

First, in Embodiment 7, a file/directory structure immediately after a directory for recording an AV directory is created is the same as that shown in FIG. 20. Furthermore, a data structure in a partition space is the same as that shown in FIG. 21. FIG. 27 is a flow chart showing processing in the case where a subdirectory is created under an AV directory on a disk having the above-mentioned data structure.

In FIG. 27, the content of LBN=0 to 250 on the disk 1 is read to the memory section 4 (Step S241). Then, information in an AV directory reservation region in the memory section 4 is scanned to determine whether or not there is a non-recorded region sufficient for newly recording a file identifier descriptor and a file entry for an AV subdirectory (Step S242).

When it is determined that there is not a sufficient non-recorded region (Step S242: No), error processing is performed, and creation of an AV subdirectory is ended. When it is determined that there is a sufficient non-recorded region (Step S242: Yes), a file identifier descriptor, a file entry, and an AV subdirectory file are recorded in a non-recorded region in the AV reservation region in the memory section 4 (Step S243).

When a file identifier descriptor, a file entry, and an AV subdirectory file are recorded, the size of the extent of the AV_DIR1 directory is changed. Therefore, an allocation descriptor of the file entry of the AV_DIR1 directory is rewritten in accordance with the change. More specifically, the extent length of the extent (1) is changed by addition of the file identifier descriptor, and a portion in which the file entry and the directory file are recorded is excluded from the extent (2).

Next, information on a space bitmap in the memory section 4 is updated if required (Step S244). The content of the memory section 4 is written back to LBN=0 to 250 on the disk 1 (Step S245).

An AV subdirectory AV_SUB_DIR1 is created under the directory AV_DIR1 by the above-mentioned series of processing. A directory structure after creation of an AV subdirectory is the same as that shown in FIG. 23.

FIG. 28 shows a partition structure after creation of an AV subdirectory. In FIG. 28, in the same way as in Embodiment 1, a file identifier descriptor is recorded so as to be added to the end of the extent (1) that is a recorded extent of the subdirectory AV_SUB_DIR1. On the other hand, for recording a new file entry and a directory file, logical blocks are used in decreasing order of LBN in the AV directory reservation region.

Figure 29:
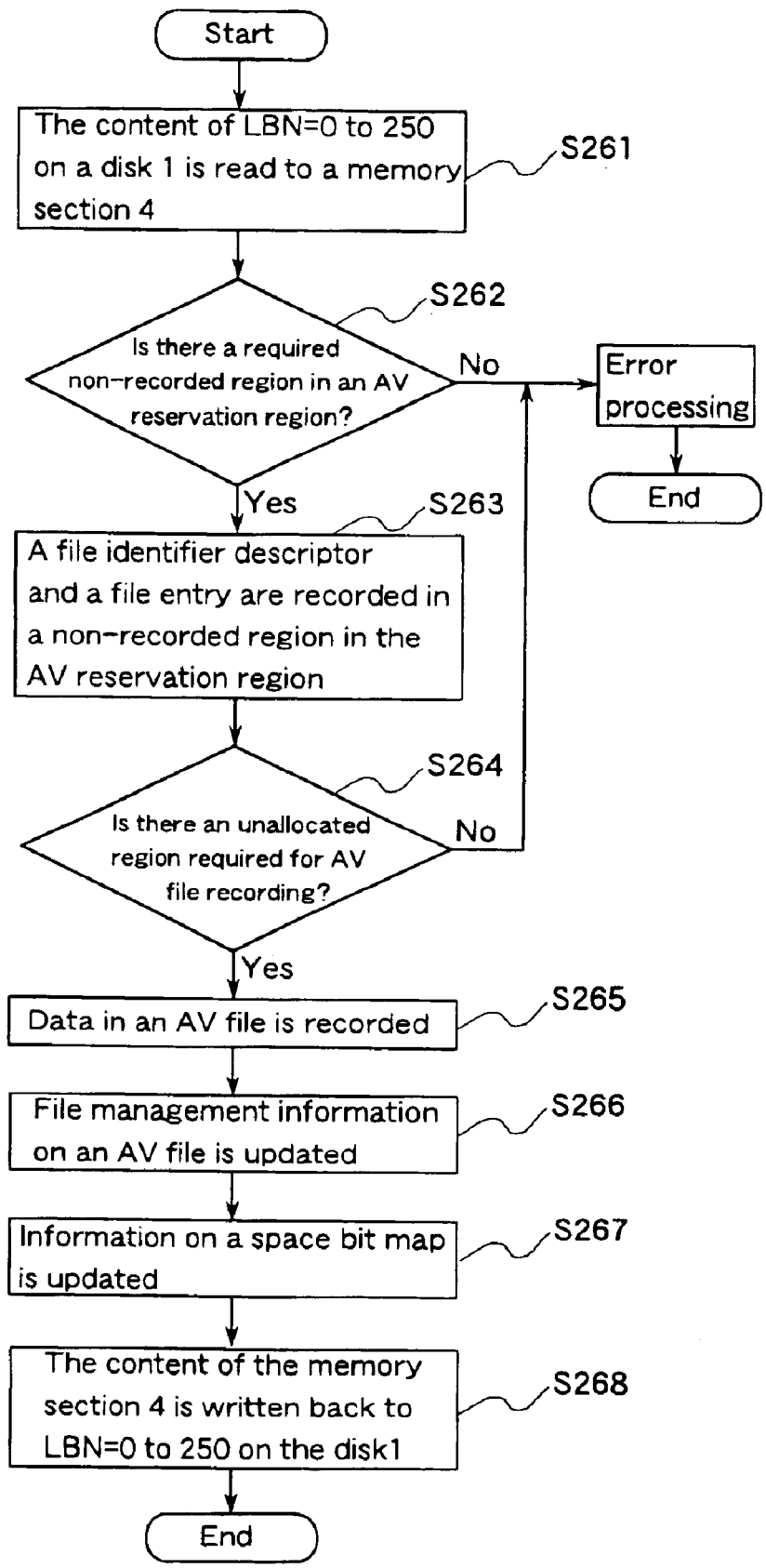
FIG. 29 is a flow chart showing processing of recording AV data under a subdirectory in the AV data recording apparatus in Embodiment 7 of the present invention.

Next, FIG. 29 is a flow chart showing processing for recording an AV file on a disk having the above-mentioned data structure. In FIG. 29, the content of LBN=0 to 250 on the disk 1 is read to the memory section 4 (Step S261), and information in an AV directory reservation region in the memory section 4 is scanned to determine whether or not there is a non-recorded region sufficient for newly recording a file identifier descriptor and a file entry (Step S262).

When it is determined that there is not a sufficient non-recorded region (Step S262: No), error processing is performed, and recording of an AV file is ended. When it is determined that there is a sufficient non-recorded region (Step S262: Yes), a file identifier descriptor and a file entry are recorded in a non-recorded region in the AV reservation region in the memory section 4 (Step S263).

Next, the space bitmap in the memory section 4 is scanned to determine whether or not there are the required number of unallocated logical blocks for recording an AV file (Step S264). VVhen it is determined that there are not the required number of unallocated logical blocks (Step S264: No), error processing is performed, and recording of an AV file is ended. When it is determined that there are the required number of unallocated logical blocks (Step S264: Yes), data are recorded in a logical block corresponding to the region (Step S265).

When recording of AV file data is completed, in order to update file management information of the AV file, information on the position and length of the extent of the AV file is recorded in an allocation descriptor of the file entry in the memory section 4 created in Step S263 (Step S266).

Next, with respect to the space bitmap in the memory section 4, bits corresponding to logical blocks in which data is recorded in Step S266 are changed to "1" representing an "allocated" state (Step S267). Then, the content of the memory section 4 is written back to LBN=0 to 250 on the disk 1 (Step S268). Thus, an AV file can be recorded in the subdirectory AV_SUB_DIR1.

Figure 31:
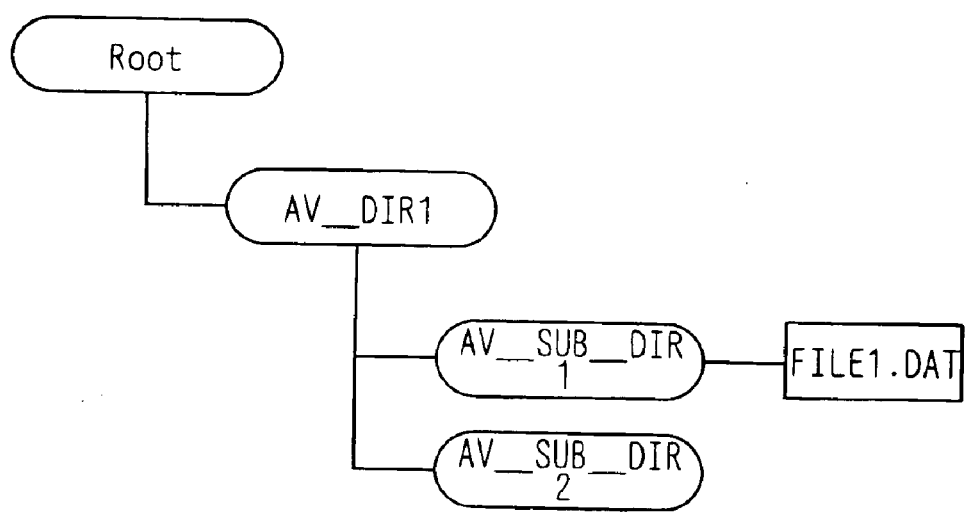
FIG. 31 illustrates a directory structure after a subdirectory is created in the AV data recording apparatus in Embodiment 7 of the present invention.

FIG. 30 shows a structure in a partition space after an AV file FAILE1.DAT is recorded in the AV subdirectory AV_SUB_DIR1, and a new subdirectory AV_SUB_DIR2 is created. In FIG. 30, in an AV reservation region in the directory AV_DIR1, an AV subdirectory, file management information of an AV file recorded in the AV subdirectory, and an AV subdirectory file are recorded. Because of this structure, even in the case where files in different AV subdirectories are accessed continuously, seeking with respect to the disk can be reduced. FIG. 31 shows a directory structure in this case.

When an AV file is reproduced from a disk having the above-mentioned data structure, a root directory is read, and a directory AV_DIR1 is read. At this time, a region containing a portion corresponding to an AV reservation region allocated to the directory AV_DIR1 (i.e., LBN=0 to 250) is read to the memory section 4.

Then, an extent of the subdirectory AV_SUB_DIR1 in the memory section 1 is scanned to obtain a name of a file recorded in the subdirectory AV SUB_DIR1.

Even in the case where a file in another AV subdirectory is read, since the extent of the directory file has already been read to the memory section 4, an intended file can be accessed by scanning such information.

As described above, in Embodiment 7, even in the case where a directory has a hierarchical structure, seeking during creation/reading of a file can be reduced substantially.

Embodiment 8

For the purpose of performing real-time recording, an AV file is often recorded, skipping a defective block without conducting replacement processing, as described in WO 98/14938.

On the other hand, when file management information recorded in an AV reservation region cannot be read due to a defect of a disk or the like, reproduction of a file becomes impossible; therefore, recording with high reliability is required.

According to an AV data recording method in Embodiment 8, when a directory for recording an AV file is created, and an AV reservation region is kept, a defective block is examined. When a defective block is found, the subsequent block is used instead of the defective block, and an AV reservation region is kept.

Because of the above, continuity of data to be recorded in the AV reservation region is not impaired, and recording can be performed with high reliability.

Embodiment 9

In the case where an AV file has a thumbnail image as a separate file, a continuous region for recording the thumbnail image is kept as a reservation region.

Since the thumbnail image is recorded in the continuous region, a thumbnail list of a recorded file can be displayed to a user at a high speed.

Embodiment 10

In the above-mentioned embodiments, when a new AV file is recorded, it is determined whether or not there is a non-recorded region in an AV reservation region; when it is determined that there is not a sufficient non-recorded region for recording a new AV file, error processing is performed, and recording of an AV file is ended.

However, according to the above-mentioned processing, even when a disk capacity remains, if a non-recorded region is used up in an AV reservation region, an AV file cannot be recorded therein any more.

In Embodiment 10, in the case where an AV reservation region has an insufficient capacity, a new AV reservation region is kept, and thereafter, an AV file is recorded.

FIG. 32 shows a partition space when there is no non-recorded region in an AV reservation region due to recording of an AV file. In this case, a plurality of AV files are recorded in LBN=251 to 685. In LBN=86 to 250 that is an AV reservation region, file management information and the like of file entries with respect to the AV files are recorded. Thus, even if it is attempted to record a new AV file, the AV reservation region has no non-recorded region, so that an AV file cannot be recorded.

A new AV reservation region is kept as a "not recorded" but "allocated" extent of the directory AV_DIR1. Processing for keeping a new AV reservation region is performed in the procedure shown in FIG. 33.

Figure 33:
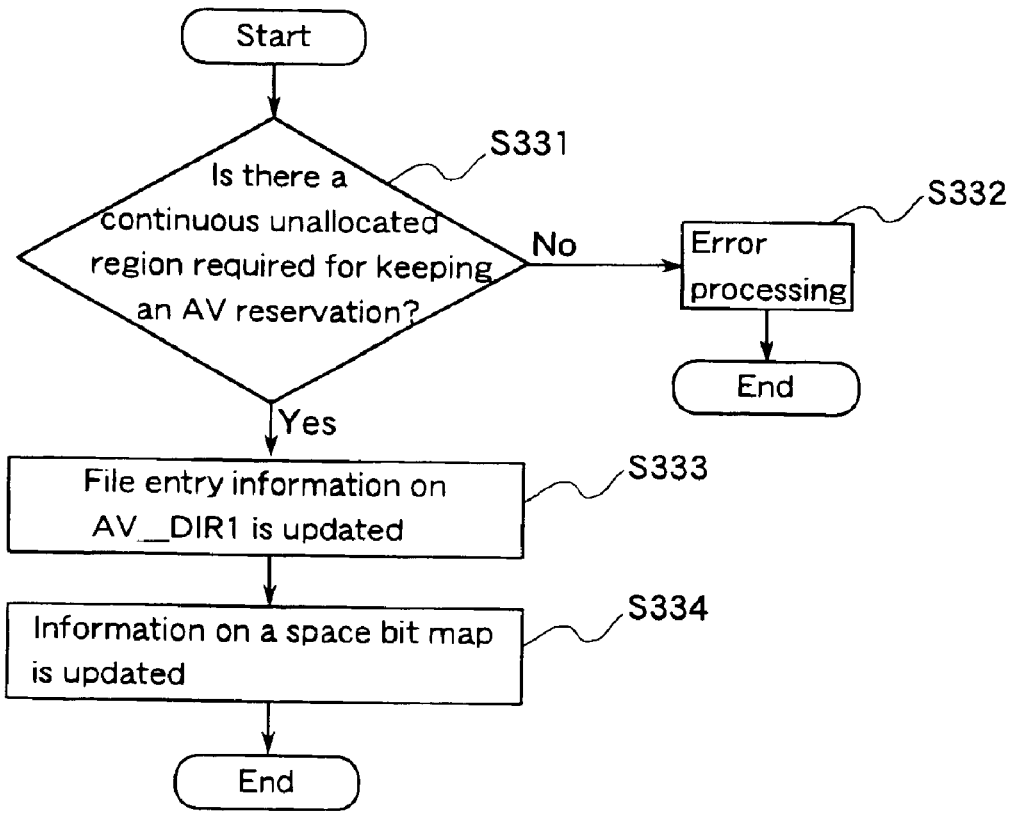
FIG. 33 is a flow chart showing processing of recording an AV file in the AV data recording apparatus in Embodiment 10 of the present invention.
Figure 35:
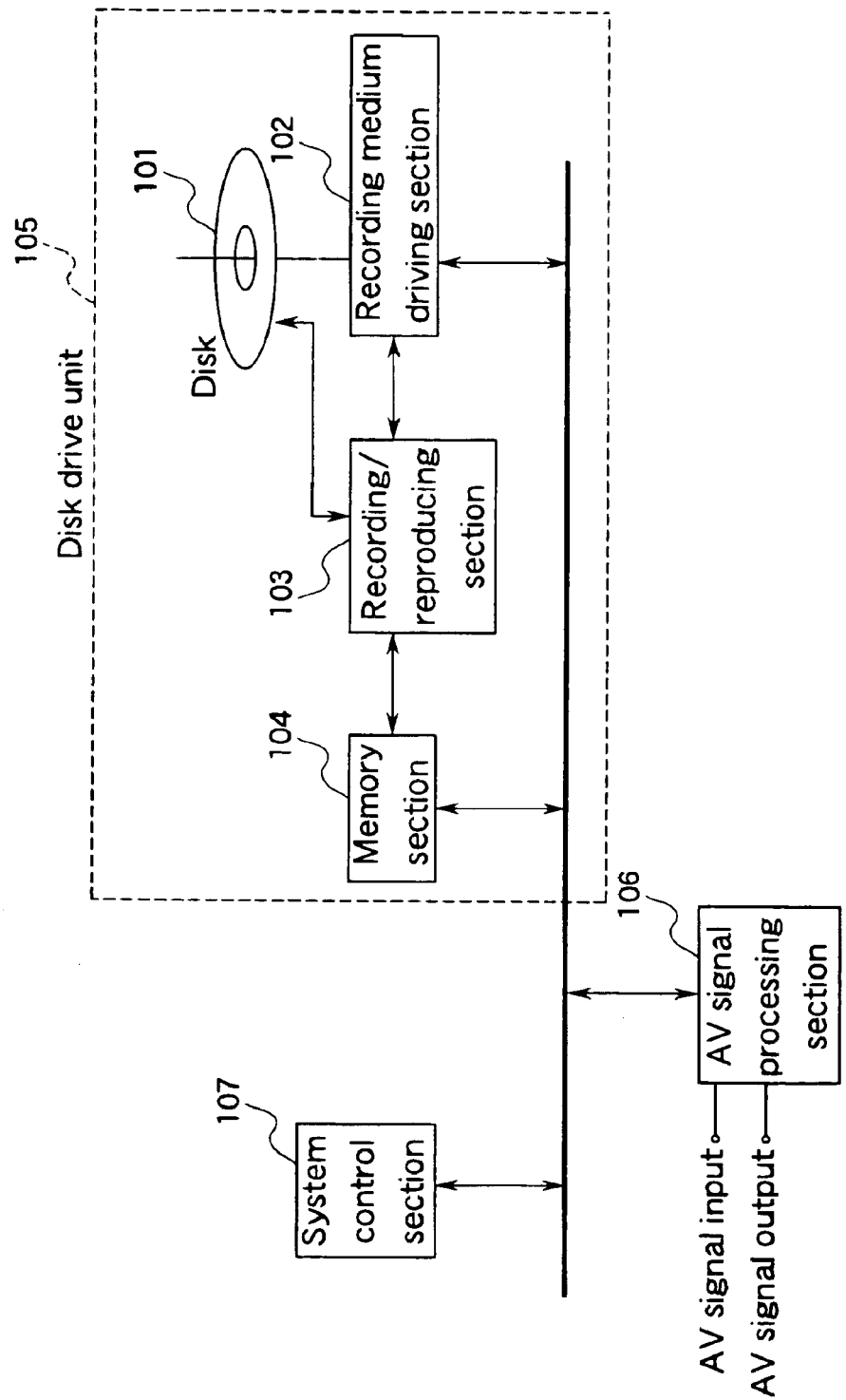
FIG. 35 shows a structure of a conventional AV data recording apparatus.
Figure 36:
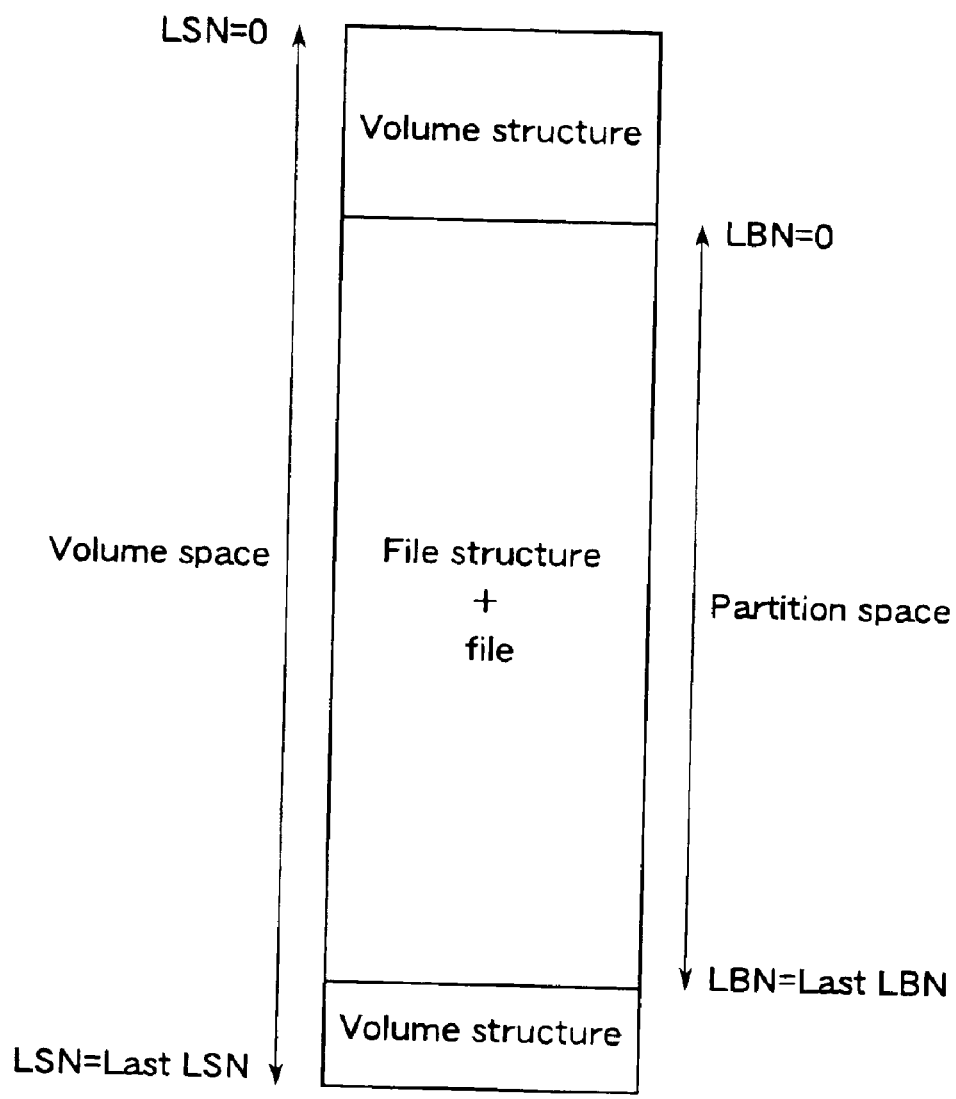
FIG. 36 illustrates a volume space structure in the conventional AV data recording apparatus.
Figure 38:
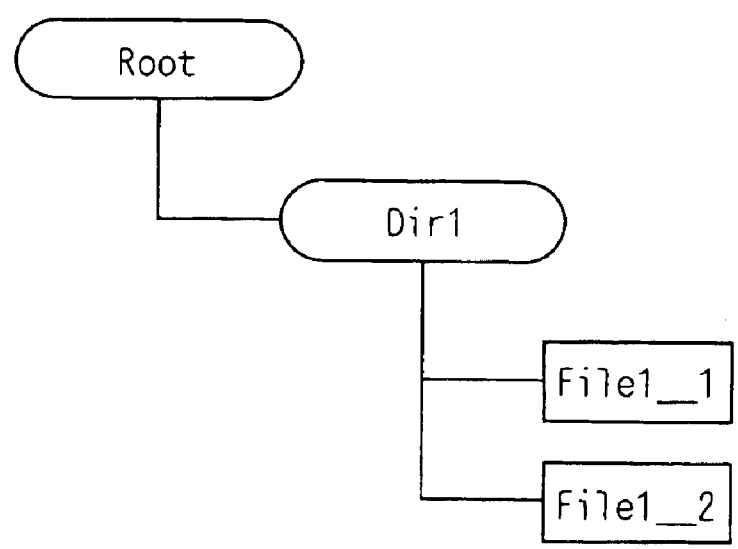
FIG. 38 illustrates a directory structure in the conventional AV data recording apparatus.
Figure 43:
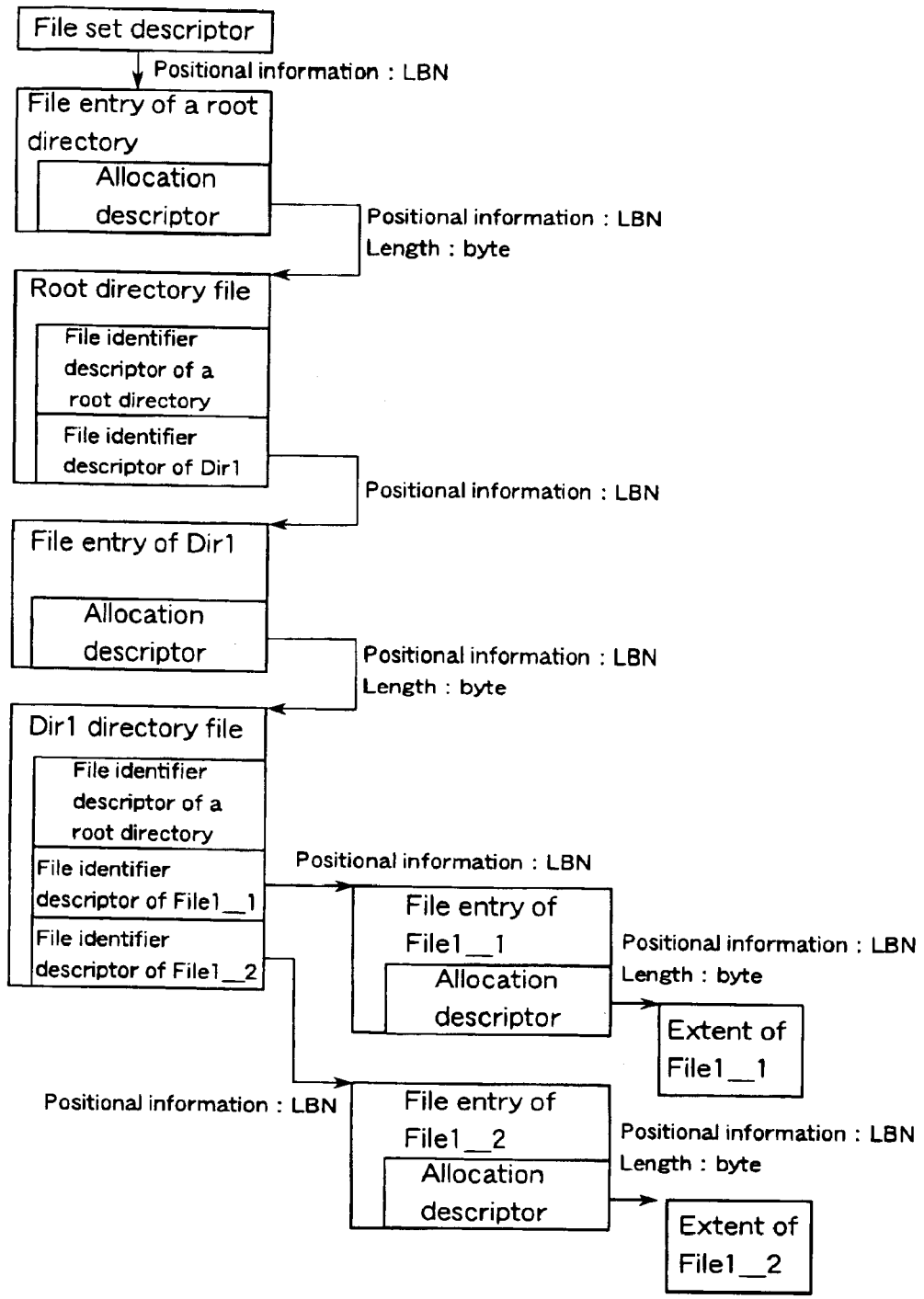
FIG. 43 illustrates a hierarchical structure of a file in the conventional AV data recording apparatus.
Figure 46:
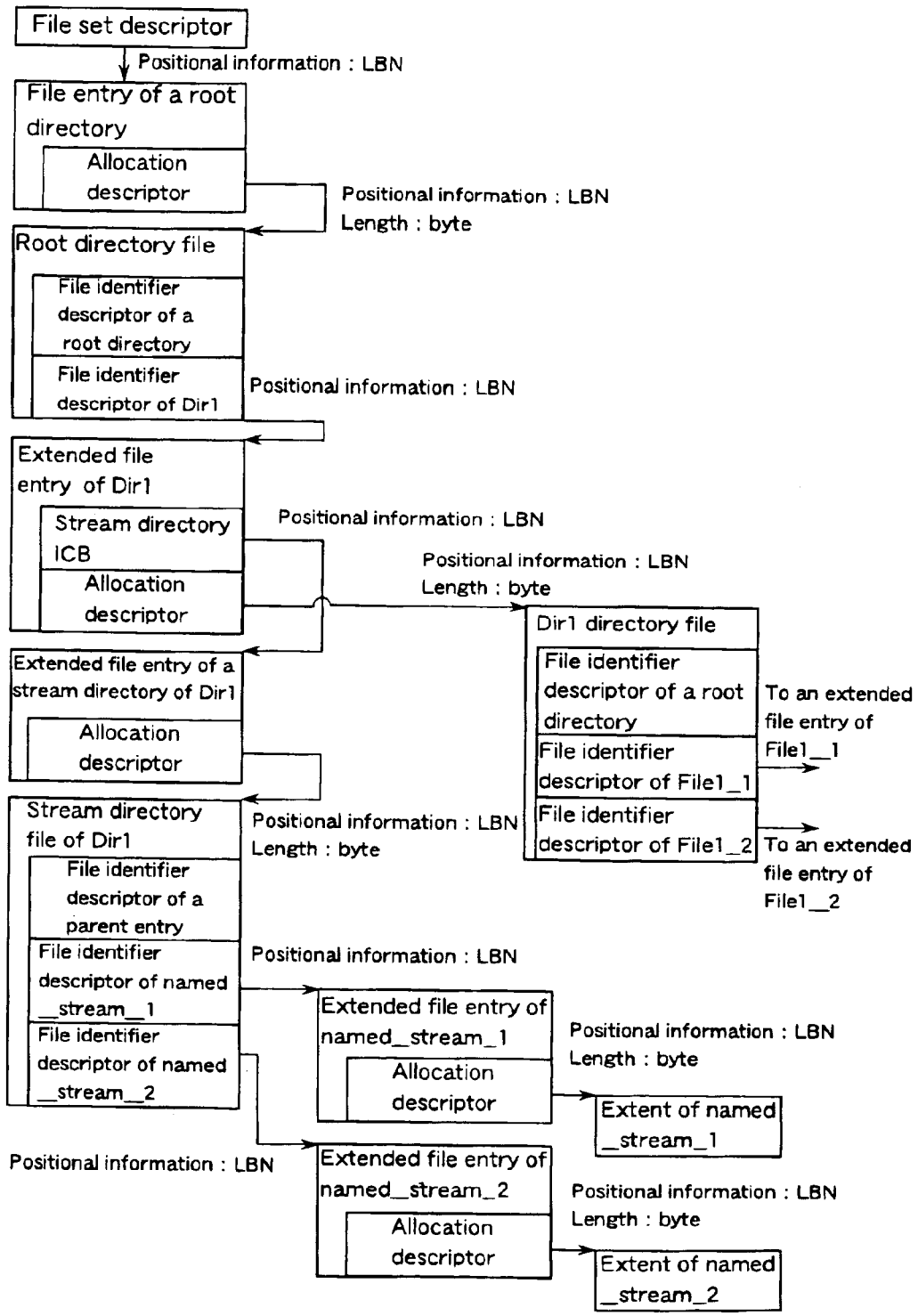
FIG. 46 illustrates a hierarchical structure of a named data stream in the conventional AV data recording apparatus.

In FIG. 33, first, information on the space bitmap is scanned to determine whether or not there are the required number of continuous unallocated logical blocks for keeping a new AV reservation region (Step S331). When it is determined that there are not the required number of logical blocks (Step S331: No), error processing is performed, and an operation of keeping an AV reservation region is ended (Step S332).

When it is determined that there are the required number of logical blocks (Step S331: Yes), the unallocated region is kept as a "not recorded" but "allocated" extent (3) of the directory AV_DIR1. More specifically, information on the position and length of the extent (3) is recorded in an allocation descriptor in the file entry of the directory AV_DIR1 (Step S333).

Next, with respect to the space bitmap in the memory section 4, bits corresponding to logical blocks of the extent (3) are changed to "1" representing an "allocated" state (Step S334).

FIG. 34 shows a state of a partition space after a new AV reservation region is kept. In FIG. 34, LBN=686 to 850 is kept as a new AV reservation region.

The processing procedure for keeping a new AV reservation region is not limited to the above-mentioned order. For example, the following may be possible: after it is determined whether or not there are the required number of logical blocks, information on the space bitmap is changed; thereafter, information on the extent (3) is recorded in an allocation descriptor in the file entry of the directory AV_DIR1.

Furthermore, as described in Embodiment 2, in the case where the AV reservation region is kept as an extent of a management file AVFILES.IFO, a new AV reservation region should be kept as an extent of the management file AVFILES.IFO.

Furthermore, in the case where an AV reservation region is kept as a named stream, the new AV reservation region may be kept as a named stream.

As described above, in the AV data recording apparatus of the present invention, by recording file management information and attribute information of an AV file in a continuous region that has been kept previously, seeking with respect to a disk, which prevents real-time recording/reproduction of an AV file, can be reduced.

Furthermore, even in the case where a large number of still images of JPEG compression are recorded, since the file management region is recorded in a continuous region, the still images can be read at a high speed.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An AV data recording apparatus, comprising:

a recording/reproducing section for recording AV data onto a disk and reproducing the recorded AV data; and a system control section for controlling a method of recording/reproducing AV data, wherein the apparatus has extent management information for managing continuous blocks on the disk as an extent, the apparatus has file management information for managing a group of the extents as a file, the apparatus has directory information for managing a group of the files as a directory, an area in a user area is kept as a reservation extent for recording at least any one of the directory information, the file management information, a part of the file, and a whole of the file, and information concerning the position and capacity of the reservation extent is recorded previously on the disk, the information concerning the reservation extent being different from said any one of the director information, the file management information, the part of the file or the whole of the file.

2. An AV data recording apparatus according to claim 1, wherein the reservation extent is kept as an allocated extent.

3. An AV data recording method, comprising:

recording AV data onto a disk and reproducing the recorded AV data;

controlling a method of recording/reproducing AV data;

using extent management information for managing continuous blocks on the disk as an extent, using file management information for managing a group of extents as a file, using directory information for managing a group of the files as a directory, keeping an area in a user area a reservation extent for recording at least any one of the directory information, the file management information, a part of the file, and a whole of the file, and recording previously on the disk information concerning the position and capacity of the reservation extent, the information concerning the reservation extent being different from said any one of the directory information, the file management information, the part of the file or the whole of the file.

4. An AV data recording method according to claim 3, wherein the reservation extent is kept as an allocated extent.

5. An AV data recording apparatus according to claim 2, wherein the reservation extent is kept as an allocated and recorded extent.

6. An AV data recording method according to claim 4, wherein the reservation extent is kept as an allocated and recorded extent.

* * * * *